US011237352B2

(12) United States Patent
Park et al.

(10) Patent No.: US 11,237,352 B2
(45) Date of Patent: Feb. 1, 2022

(54) LENS MOVING APPARATUS AND CAMERA MODULE AND OPTICAL DEVICE INCLUDING THE SAME

(71) Applicant: LG INNOTEK CO., LTD., Seoul (KR)

(72) Inventors: Sang Ok Park, Seoul (KR); Jun Taek Lee, Seoul (KR); Byung Wook Son, Seoul (KR); Sang Jun Min, Seoul (KR); Kyoung Ho Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 192 days.

(21) Appl. No.: 16/727,107

(22) Filed: Dec. 26, 2019

(65) Prior Publication Data
US 2020/0132962 A1 Apr. 30, 2020

Related U.S. Application Data

(63) Continuation of application No. 15/890,919, filed on Feb. 7, 2018, now Pat. No. 10,551,587, which is a (Continued)

(30) Foreign Application Priority Data

Apr. 30, 2015 (KR) .................. 10-2015-0061040
Jun. 29, 2015 (KR) .................. 10-2015-0091810

(51) Int. Cl.
G02B 7/04 (2021.01)
G02B 7/08 (2021.01)
(Continued)

(52) U.S. Cl.
CPC ............... G02B 7/08 (2013.01); G02B 7/00 (2013.01); G02B 7/023 (2013.01); G02B 27/646 (2013.01);
(Continued)

(58) Field of Classification Search
CPC . G02B 7/08; G02B 7/00; G02B 7/023; G02B 7/02; G02B 7/04; G02B 27/64; G02B 27/646; H04N 5/2257; H04N 5/2358
(Continued)

(56) References Cited

U.S. PATENT DOCUMENTS 5,619,030 A 4/1997 Shiomi
8,041,201 B2 10/2011 Eromaki et al.
(Continued)

FOREIGN PATENT DOCUMENTS

CN 102879972 A 1/2013
EP 2816403 A1 12/2014
(Continued)

OTHER PUBLICATIONS

Extended European Search Report dated Sep. 23, 2016 in European Application No. 16166401.6.
(Continued)

Primary Examiner — William R Alexander
(74) Attorney, Agent, or Firm — Saliwanchik, Lloyd & Eisenschenk

(57) ABSTRACT

Embodiments provide a lens moving apparatus including a bobbin including a first coil disposed on an outer circumferential surface thereof, a housing provided with first and second magnets for moving the bobbin by interaction with the first coil, upper and lower elastic members each coupled to both the bobbin and the housing, and a first position sensor for detecting a sum of intensities of magnetic fields of the first and second magnets, wherein the first position sensor is disposed in a space between the first magnet and the second magnet when the bobbin is disposed at an initial position.

19 Claims, 29 Drawing Sheets

Related U.S. Application Data continuation of application No. 15/144,148, filed on May 2, 2016, now Pat. No. 9,921,388.

(51) Int. Cl.
*G02B 7/00* (2021.01)
*G02B 7/02* (2021.01)
*G02B 27/64* (2006.01)
*H04N 5/225* (2006.01)
*H04N 5/232* (2006.01)

(52) U.S. Cl.
CPC ....... *H04N 5/2257* (2013.01); *H04N 5/23258* (2013.01)

(58) Field of Classification Search
USPC ........................................... 359/557
See application file for complete search history.

(56) References Cited

U.S. PATENT DOCUMENTS

| | | | | |
|---|---|---|---|---|
| 8,279,289 | B2* | 10/2012 | Nagata | H04N 5/23287 348/208.11 |
| 8,406,617 | B2* | 3/2013 | Yanagisawa | H04N 5/2254 396/55 |
| 8,571,399 | B2* | 10/2013 | Minamisawa | G03B 5/04 396/55 |
| 2007/0171208 | A1 | 7/2007 | Sung et al. | |
| 2008/0187301 | A1 | 8/2008 | Takahashi | |
| 2010/0091120 | A1* | 4/2010 | Nagata | G02B 27/646 348/208.4 |
| 2010/0232161 | A1 | 9/2010 | Aschwanden et al. | |
| 2011/0096178 | A1 | 4/2011 | Ryu et al. | |
| 2011/0262122 | A1* | 10/2011 | Minamisawa | G03B 5/00 396/55 |
| 2012/0008221 | A1 | 1/2012 | Min et al. | |
| 2012/0020654 | A1* | 1/2012 | Yanagisawa | G02B 27/646 396/55 |
| 2012/0026611 | A1 | 2/2012 | Hu et al. | |
| 2013/0119785 | A1 | 5/2013 | Han | |
| 2014/0355120 | A1 | 12/2014 | Yeo | |
| 2015/0153539 | A1* | 6/2015 | Yoo | G03B 13/34 348/373 |
| 2015/0177479 | A1 | 6/2015 | Lee et al. | |
| 2015/0253583 | A1 | 9/2015 | Cho et al. | |
| 2015/0301353 | A1 | 10/2015 | Takeuchi | |
| 2016/0025995 | A1 | 1/2016 | Ariji | |
| 2016/0033786 | A1 | 2/2016 | Kim et al. | |
| 2016/0070115 | A1 | 3/2016 | Miller et al. | |
| 2016/0231528 | A1 | 8/2016 | Wong et al. | |
| 2017/0115463 | A1 | 4/2017 | Osaka et al. | |
| 2017/0118411 | A1 | 4/2017 | Morinaga | |

FOREIGN PATENT DOCUMENTS

| | | |
|---|---|---|
| JP | 3-230595 A | 10/1991 |
| JP | 2014-056031 A | 3/2014 |
| JP | 2015-34911 A | 2/2015 |
| KR | 10-2010-0108259 A | 10/2010 |
| KR | 10-2015-0022641 A | 3/2015 |
| WO | WO-2014/157998 A1 | 10/2014 |
| WO | WO-2015/020000 A1 | 2/2015 |

OTHER PUBLICATIONS

Office Action dated Oct. 24, 2019 in Chinese Application No. 201610282618.0.
Notice of Allowance dated Sep. 25, 2019 in U.S. Appl. No. 15/890,919.
Office Action dated Aug. 18, 2021 in Korean Application No. 10-2015-0061040.
Office Action dated Sep. 10, 2021 in Korean Application No. 10-2015-0091810.

* cited by examiner

LENS MOVING APPARATUS AND CAMERA MODULE AND OPTICAL DEVICE INCLUDING THE SAME

CROSS REFERENCE TO RELATED APPLICATIONS

This application is a continuation of U.S. application Ser. No. 15/890,919, filed Feb. 7, 2018; which is a continuation of U.S. application Ser. No. 15/144,148, filed May 2, 2016, now U.S. Pat. No. 9,921,388, issued Mar. 20, 2018, which claims benefit under 35 U.S.C. § 119 of Korean Patent Application Nos. 10-2015-0061040, filed Apr. 30, 2015; and 10-2015-0091810, filed Jun. 29, 2015, all of which are hereby incorporated by reference in their entirety.

TECHNICAL FIELD

Embodiments relate to a lens moving apparatus and to a camera module and an optical device each including the same.

BACKGROUND

Technology of a voice coil motor (VCM), which is used in existing general camera modules, is difficult to apply to a micro-scale, low-power camera module, and studies related thereto have been actively conducted.

In the case of a camera module configured to be mounted in a small electronic product, such as a smart phone, the camera module may frequently receive shocks when in use, and may undergo fine shaking due to, for example, the shaking of a user's hand. In consideration of this fact, there is a demand for the development of technology enabling a device for inhibiting handshake to be additionally installed to a camera module.

BRIEF SUMMARY

Embodiments provide a lens moving apparatus and a camera module and an optical device each including the same, which are able to improve the reliability of operation of auto-focusing by inhibiting an effect thereon attributable to deviation in the intensity of a magnetic field of a magnet due to variation in temperature, and which are able to automatically compensate for variation in the focal length of the lens caused by variation in temperature.

Furthermore, embodiments provide a lens moving apparatus and a camera module and an optical device each including the same, which are able to suppress the generation of cracks in terminals and to inhibit breakage of the terminals.

In one embodiment, a lens moving apparatus includes a bobbin including a first coil disposed on an outer circumferential surface thereof, a housing provided with first and second magnets for moving the bobbin by interaction with the first coil, upper and lower elastic members each coupled to both the bobbin and the housing, and a first position sensor for detecting a sum of intensities of magnetic fields of the first and second magnets, wherein the first position sensor is disposed in a space between the first magnet and the second magnet when the bobbin is disposed at an initial position.

The first position sensor may be disposed on an outer circumferential surface of the bobbin so as to be spaced apart from the first coil such that the first position sensor is disposed in the space between the first magnet and the second magnet when the bobbin is disposed at the initial position.

The first magnet may be disposed at an upper end of the housing, and the second magnet may be disposed at a lower end of the housing so as to be spaced apart from the first magnet.

The first position sensor may not overlap the first magnet or the second magnet in a direction perpendicular to an optical axis when the bobbin is disposed at the initial position.

The first position sensor may include a detecting portion for detecting intensity of a magnetic field, and the detecting portion of the first position sensor may be disposed in the space between the first magnet and the second magnet and may not overlap the first magnet or the second magnet in a direction perpendicular to an optical axis when the bobbin is disposed at the initial position.

The detecting portion of the first position sensor may be positioned so as to face the outer circumferential surface of the bobbin.

The detecting portion of the first position sensor may detect intensity of a magnetic field in which a line of magnetic force is directed from an inner circumferential surface toward the outer circumferential surface of the bobbin.

The detecting portion of the first position sensor may be aligned with an upper surface of the first magnet in the direction perpendicular to the optical axis when the bobbin is disposed at a first position, and the first position may be a highest position to which the bobbin is moved by interaction between the first coil and the first and second magnets.

The detecting portion of the first position sensor may be aligned with an imaginary line or plane, which is spaced upward and apart from an upper surface of the first magnet by a first distance, in the direction perpendicular to the optical axis when the bobbin is disposed at a first position, and the first position may be a highest position, to which the bobbin is moved by interaction between the first coil and the first and second magnets.

The first distance may be 100 μm or less.

The detecting portion of the first position sensor may be aligned with an upper surface of the second magnet in the direction perpendicular to the optical axis when the bobbin is disposed at a second position, and the second position may be a lowest position, to which the bobbin is moved by interaction between the first coil and the first and second magnets.

The detecting portion of the first position sensor may be aligned with an imaginary line or plane, which is spaced downward apart from an upper surface of the second magnet by a second distance, in the direction perpendicular to the optical axis when the bobbin is disposed at a second position, and the second position may be a lowest position, to which the bobbin is moved by interaction between the first coil and the first and second magnets.

The second distance may be 100 μm or less.

The housing may include a first side portion, a second side portion, a first magnet seat formed at an upper end of an outer portion of the first side portion, the first magnet being disposed in the first magnet seat, and a second magnet seat formed at a lower end of an inner portion of the second side portion, the second magnet being disposed in the second magnet seat.

In another embodiment, a lens moving apparatus includes a bobbin including a first coil disposed on an outer circumferential surface thereof, a housing provided with first and second magnets for moving the bobbin by interaction with the first coil, upper and lower elastic members each coupled to both the bobbin and the housing, and a first position sensor for detecting a sum of intensities of magnetic fields of the first and second magnets, wherein a sum of intensities of magnetic fields detected by the first position sensor is zero or greater while the bobbin moves.

The first position sensor may be disposed in the space between the first magnet and the second magnet when the bobbin is disposed at an initial position.

Intensity of a magnetic field of the first magnet, intensity of a magnetic field of the second magnet, and a sum of intensities of magnetic fields of the first and second magnets detected by the first position sensor may have positive values when the bobbin is disposed at a first position, and the first position may be a highest position to which the bobbin is moved by interaction between the first coil and the first and second magnets.

Intensity of a magnetic field of the first magnet, intensity of a magnetic field of the second magnet, and a sum of intensities of magnetic fields of the first and second magnets detected by the first position sensor may have positive values when the bobbin is disposed at an initial position, and the initial position may be a position of the bobbin when no power is applied to the first coil.

In a further embodiment, a camera module includes a lens barrel, the lens moving apparatus according to the first embodiment for moving the lens barrel, and an image sensor for converting an image, introduced through the lens moving apparatus, into an electric signal.

In still a further embodiment, an optical apparatus includes a display module including a plurality of pixels, the plurality of pixels being changed in color in response to an electric signal, the camera module according to the third embodiment for converting an image, introduced through a lens, into an electric signal, and a controller for controlling operation of the display module and the camera module.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
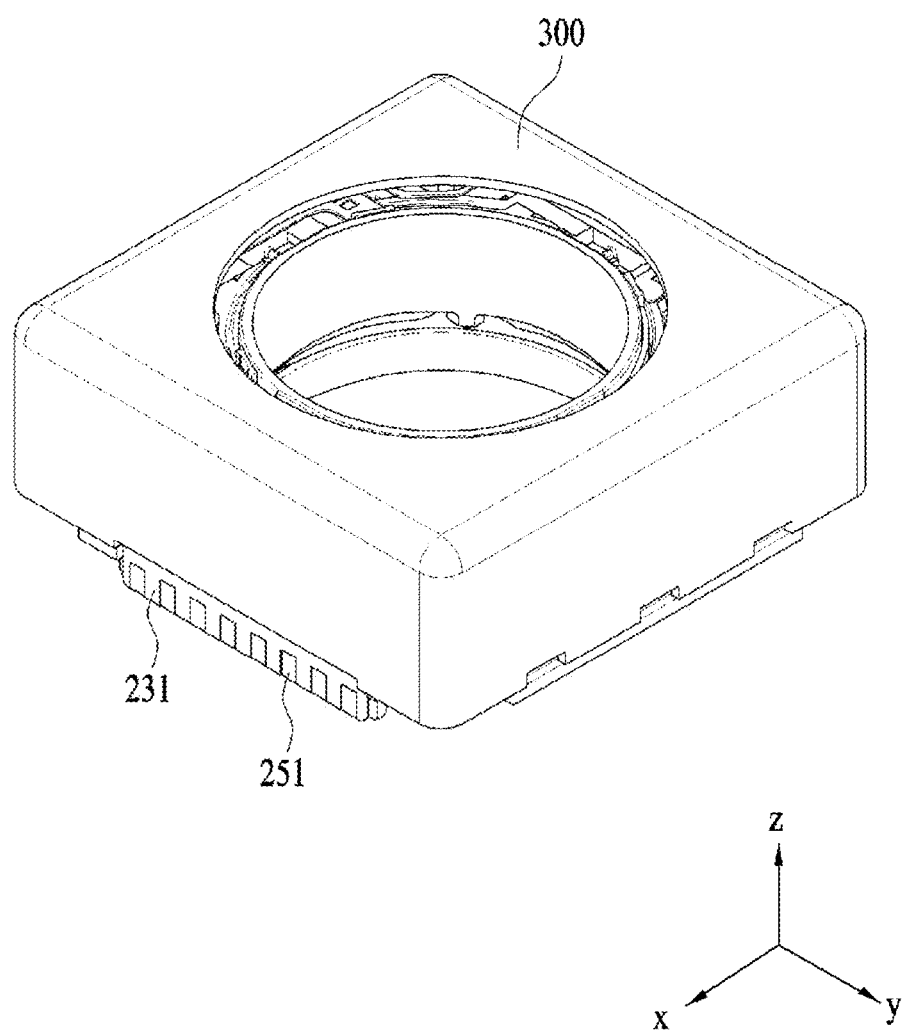
FIG. 1 is a perspective view illustrating a lens moving apparatus according to an embodiment.

Hereinafter, embodiments will be clearly revealed via description thereof with reference to the accompanying drawings. In the following description of the embodiments, it will be understood that, when an element such as a layer (film), region, pattern, or structure is referred to as being "on" or "under" another element, it can be "directly" on or under another element or can be "indirectly" formed such that an intervening element may also be present. In addition, it will also be understood that the criteria for "on" or "under" are determined on the basis of the drawings.

In the drawings, the dimensions of layers are exaggerated, omitted or illustrated schematically for clarity and convenience of description. In addition, the dimensions of constituent elements do not entirely reflect the actual dimensions. Wherever possible, the same reference numbers will be used throughout the drawings to refer to the same or like parts.

Hereinafter, a lens moving apparatus according to an embodiment will be described with reference to the accompanying drawings. For the convenience of description, although the lens moving apparatus is described using a rectangular coordinate system (x, y, z), the lens moving apparatus may be described using some other coordinate systems, and the embodiment is not limited thereto. In the respective drawings, the X-axis and the Y-axis mean directions perpendicular to an optical axis, i.e. the Z-axis, and the optical axis (Z-axis) direction may be referred to as a "first direction", the X-axis direction may be referred to as a "second direction", and the Y-axis direction may be referred to as a "third direction".

A "handshake compensation device", which is applied to a subminiature camera module of a mobile device such as, for example, a smart phone or a tablet PC, may be a device that is configured to inhibit the contour line of a captured image from being indistinctly formed due to vibration caused by shaking of the user's hand when capturing a still image.

In addition, an "auto-focusing device" is a device that automatically focuses an image of a subject on an image sensor surface. The handshake compensation device and the auto-focusing device may be configured in various ways, and the lens moving apparatus according to the embodiment may move an optical module, which is constituted of at least one lens, in the first direction, which is parallel to the optical axis, or relative to a plane defined by the second and third directions, which are perpendicular to the first direction, thereby performing handshake compensation motion and/or auto-focusing.

Figure 2:
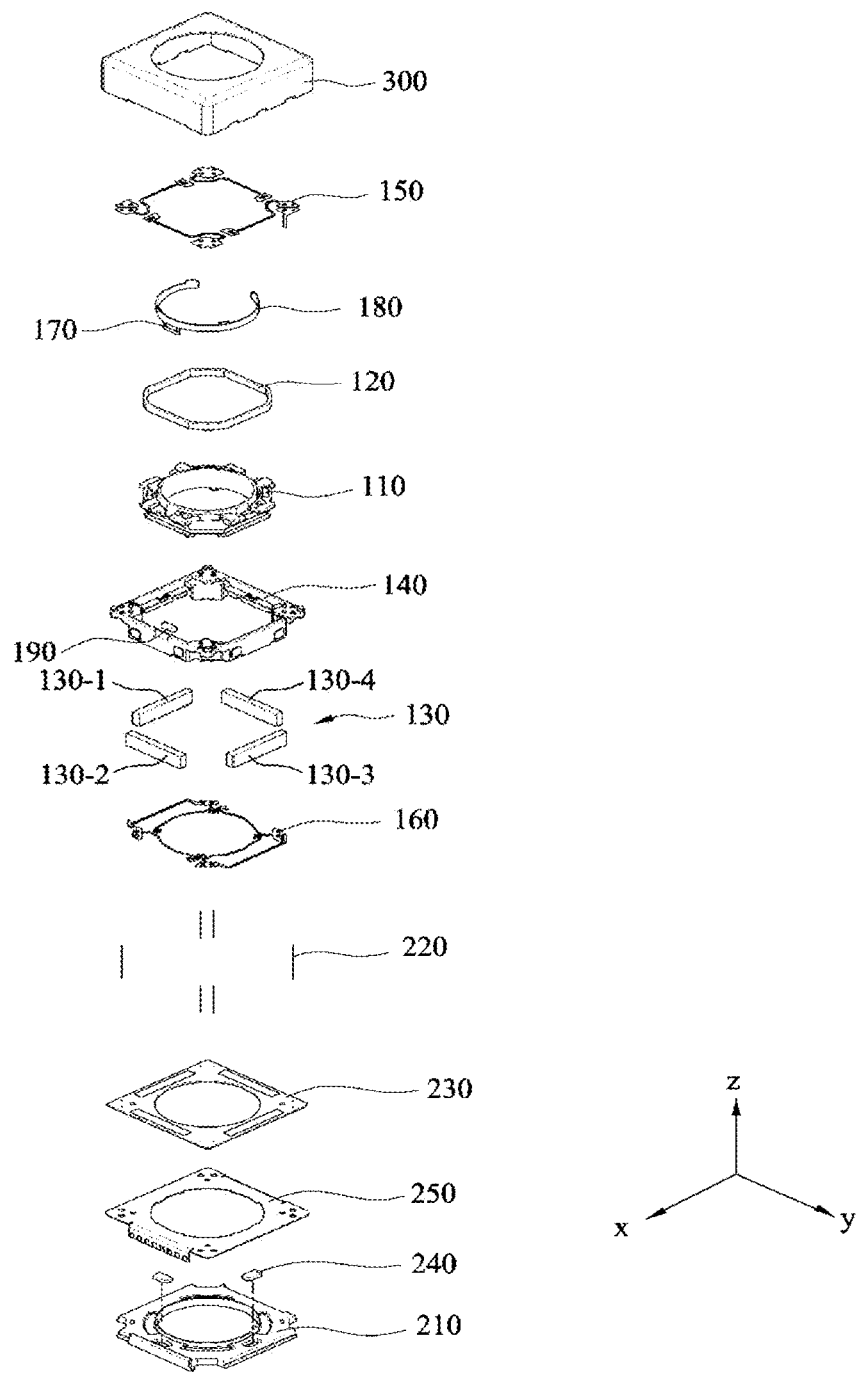
FIG. 2 is an exploded perspective view of the lens moving apparatus illustrated in FIG. 1.

FIG. 1 is a schematic perspective view illustrating the lens moving apparatus according to an embodiment, and FIG. 2 is an exploded perspective view of the lens moving apparatus illustrated in FIG. 1.

Referring to FIGS. 1 and 2, the lens moving apparatus may include a cover member 300, an upper elastic member 150, a sensor board 180, a first position sensor 170, a first coil 120, a bobbin 110, a housing 140, a first magnet 190, a second magnet 130, a lower elastic member 160, a plurality of support members 220, a second coil 230, a circuit board 250, a second position sensor 240, and a base 210.

First, the cover member 300 will be described.

The cover member 300 defines an accommodation space along with the base 210, such that the upper elastic member 150, the bobbin 110, the first coil 120, the housing 140, the first magnet 190, the second magnet 130, the lower elastic member 160, the support members 220, the second coil 230, and the circuit board 250 are accommodated in the accommodation space.

The cover member 300 may take the form of a box, which has an open bottom and includes an upper end portion and sidewalls. The bottom of the cover member 300 may be coupled to the top of the base 210. The upper end portion of the cover member 300 may have a polygonal shape, such as, for example, a square or octagonal shape.

The cover member 300 may have a bore formed in the upper end portion thereof in order to expose a lens (not shown), coupled to the bobbin 110, to outside light. In addition, the bore of the cover member 300 may be provided with a window formed of a light-transmitting material, in order to inhibit impurities, such as, for example, dust or moisture, from entering a camera module.

Although the material of the cover member 300 may be a non-magnetic material such as, for example, SUS in order to inhibit the cover member 300 from being attracted by the second magnet 130, the cover member 300 may be formed of a magnetic material, and may function as a yoke.

Figure 3:
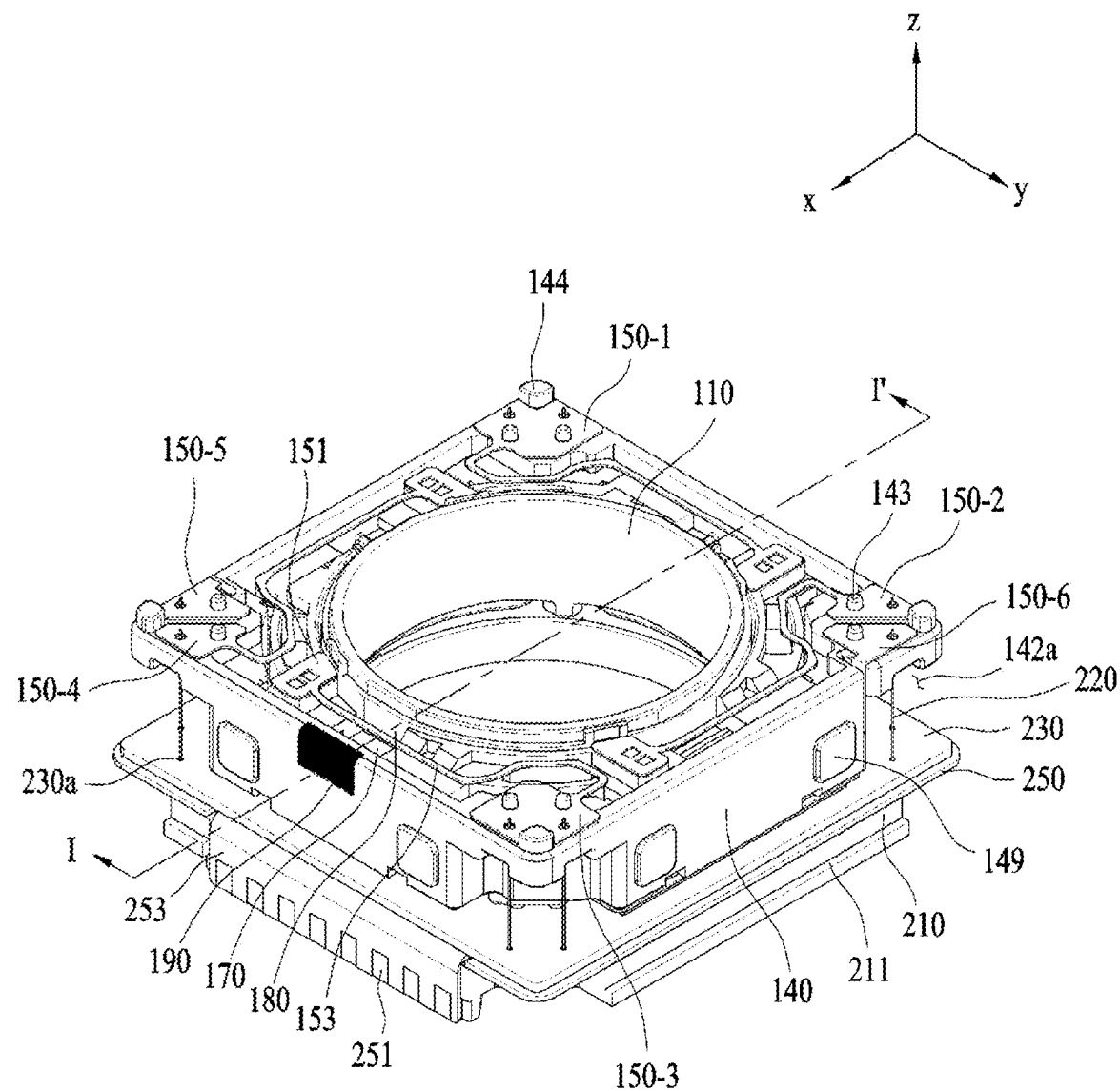
FIG. 3 is an assembled perspective view illustrating the lens moving apparatus shown in FIG. 1, from which a cover member is removed.
Figure 4:
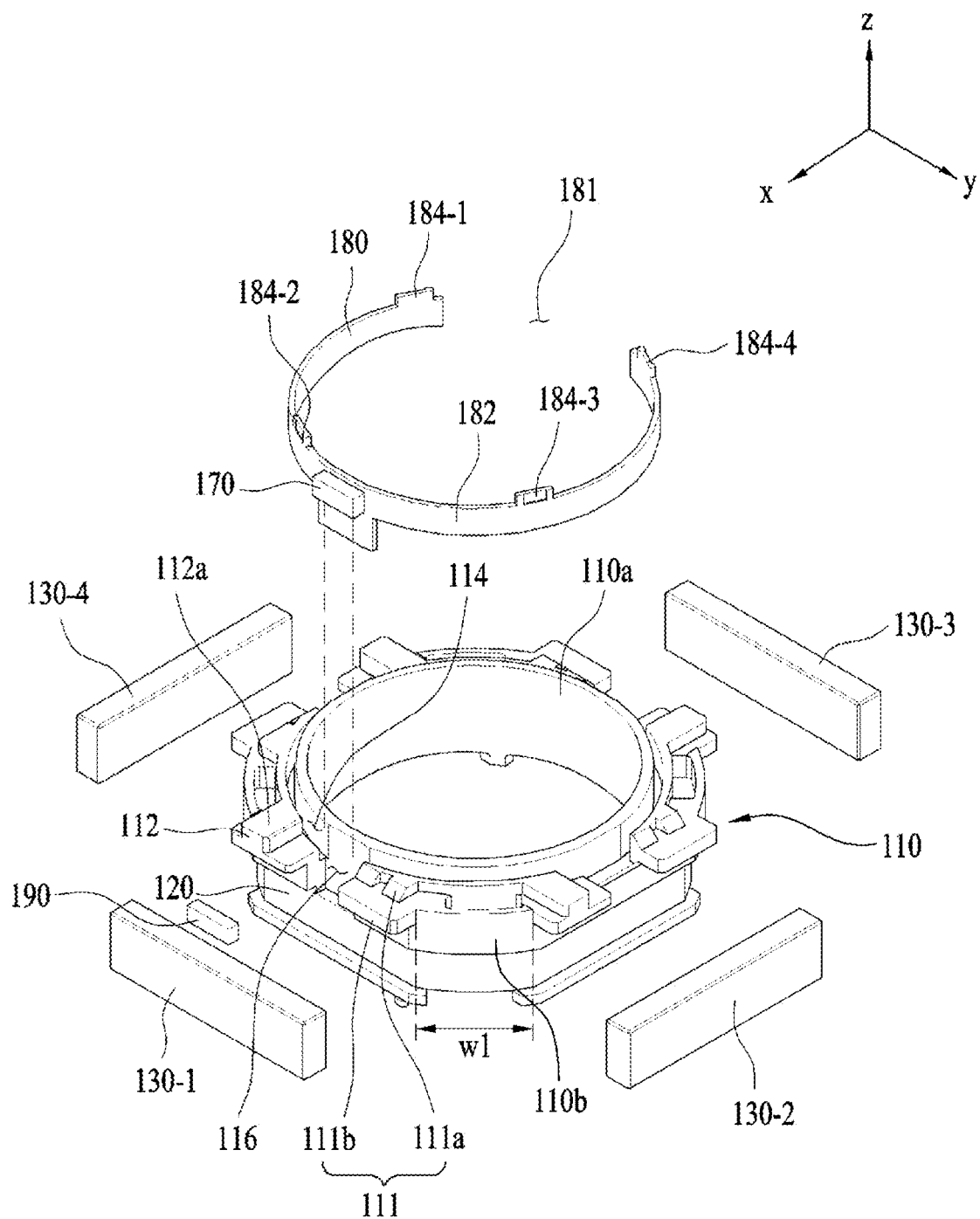
FIG. 4 is an exploded perspective view of a bobbin, a first coil, a first magnet, a second magnet, a first position sensor, and a sensor board, which are illustrated in FIG. 2.

FIG. 3 is an assembled perspective view illustrating the lens moving apparatus after removal of the cover member 300 of FIG. 1, and FIG. 4 is an exploded perspective view of the bobbin 110, the first coil 120, the first magnet 190, the second magnets 130-1 to 130-4, the first position sensor 170, and the sensor board 180 illustrated in FIG. 2.

Next, the bobbin 110 will be described.

Referring to FIGS. 3 and 4, the bobbin 110 is placed inside the housing 140, and is movable in the direction of the optical axis or in the first direction, which is parallel to the optical axis, for example, in the Z-axis direction, via electromagnetic interaction between the first coil 120 and the second magnet 130.

Although not illustrated, the bobbin 110 may include a lens barrel (not shown) in which at least one lens is installed. The lens barrel may be coupled inside the bobbin 110 in various manners.

The bobbin 110 may be configured to have a bore for mounting the lens or the lens barrel. The bore may have a circular, elliptical, or polygonal shape, without being limited thereto.

The bobbin 110 may include first and second protrusions 111 and 112.

The first protrusion 111 of the bobbin 110 may include a guide portion 111a and a first stopper 111b.

The guide portion 111a of the bobbin 110 may serve to guide the position at which the upper elastic member 150 is installed. For example, as exemplarily illustrated in FIG. 3, the guide portion 111a of the bobbin 110 may guide the path along which a first frame connector 153 of the upper elastic member 150 extends.

For example, a plurality of guide portions 111a may protrude in the second and third directions, which are perpendicular to the first direction. In addition, the guide portions 111a may be arranged in a pattern symmetric with respect to the center of the plane defined by the x-axis and the y-axis, as illustrated in the drawings, or may be arranged in a pattern asymmetric with respect to the center without interference with other components, unlike the embodiment illustrated in the drawings.

The second protrusion 112 of the bobbin 110 may be formed so as to protrude in the second and third directions, which are perpendicular to the first direction. In addition, the second protrusion 112 of the bobbin 110 may have an upper surface 112a having a shape on which the first inner frame 151 is mounted.

The first stopper 111b of the first protrusion 111 of the bobbin 110 and the second protrusion 112 of the bobbin 110 may serve to inhibit the bottom surface of the body of the bobbin 110 from directly colliding with the base 210 and the upper surface of the circuit board 250 even if the bobbin 110 moves beyond a prescribed range due to, for example, external shocks, when being moved in the first direction for auto-focusing.

The bobbin 110 may have a support groove 114 provided between the inner circumferential surface 110a and the outer circumferential surface 110b of the bobbin 110 so as to allow the sensor board 180 to be inserted into the bobbin 110 in the first direction. For example, the support groove 114 in the bobbin 110 may be provided between the inner circumferential surface 110a of the bobbin 110 and the first and second protrusions 111 and 112 so as to enable the insertion of the sensor board 180 in the first direction. Furthermore, the support groove 114 of the bobbin 110 may be configured to have the shape of a ring defined between the inner circumferential surface 110a and the outer circumferential surface of the bobbin 110.

The bobbin 110 may have a receiving recess 116, in which the first position sensor 170, which is disposed, coupled, or mounted on the sensor board 180, is received or disposed.

For example, the receiving recess 116 of the bobbin 110 may be provided in the space between the first and second protrusions 111 and 112 of the bobbin 110, so as to allow the first position sensor 170, mounted on the sensor board 180, to be inserted in the first direction.

The bobbin 110 may have a second support protrusion 117 (see FIG. 8) formed on the lower surface thereof so as to be coupled and fixed to the lower elastic member 160.

For control of auto-focusing in a single direction, the position at which the lower surfaces of the first and second protrusions 111 and 112 of the bobbin 110 come into contact with the bottom surface 146a of a first seating groove 146 in the housing 140 may be set to the initial position of the bobbin 110. Here, the initial position of the bobbin 110 may be equally applied to the description of the initial position of the movable unit, which will be set forth later.

In contrast, for control of auto-focusing in two directions, the position at which the lower surfaces of the first and second protrusions 111 and 112 of the bobbin 110 are spaced apart from the bottom surface 146a of the first seating groove 146 by a predetermined distance may be set to the initial position of the bobbin 110.

Next, the first coil 120 will be described.

The first coil 120 is disposed on the outer circumferential surface 110b of the bobbin 110.

The first coil 120 may be located so as not to overlap the first position sensor 170 in the second or third direction.

In order to ensure that the first coil 120 and the first position sensor 170 do not interfere or overlap each other in the second or third direction, the first coil 120 and the first position sensor 170 may be located on the outer circumferential surface of the bobbin 110 so as to be spaced apart from each other. For example, the first coil 120 may be located on the lower side or the lower portion of the outer circumferential surface 110b of the bobbin 110, and the first position sensor 170 may be located on the upper side of the first coil 120.

The first coil 120, as exemplarily illustrated in FIG. 4, may be wound so as to surround the outer circumferential surface 110b of the bobbin 110 in the direction in which the first coil 120 rotates about the optical axis. For example, the first coil 120 may be inserted into and coupled to a coil groove formed in the outer circumferential surface 110b of the bobbin 110, without being limited thereto.

As exemplarily illustrated in FIG. 4, the first coil 120 may be directly wound around the outer circumferential surface 110b of the bobbin 110.

Figure 8:
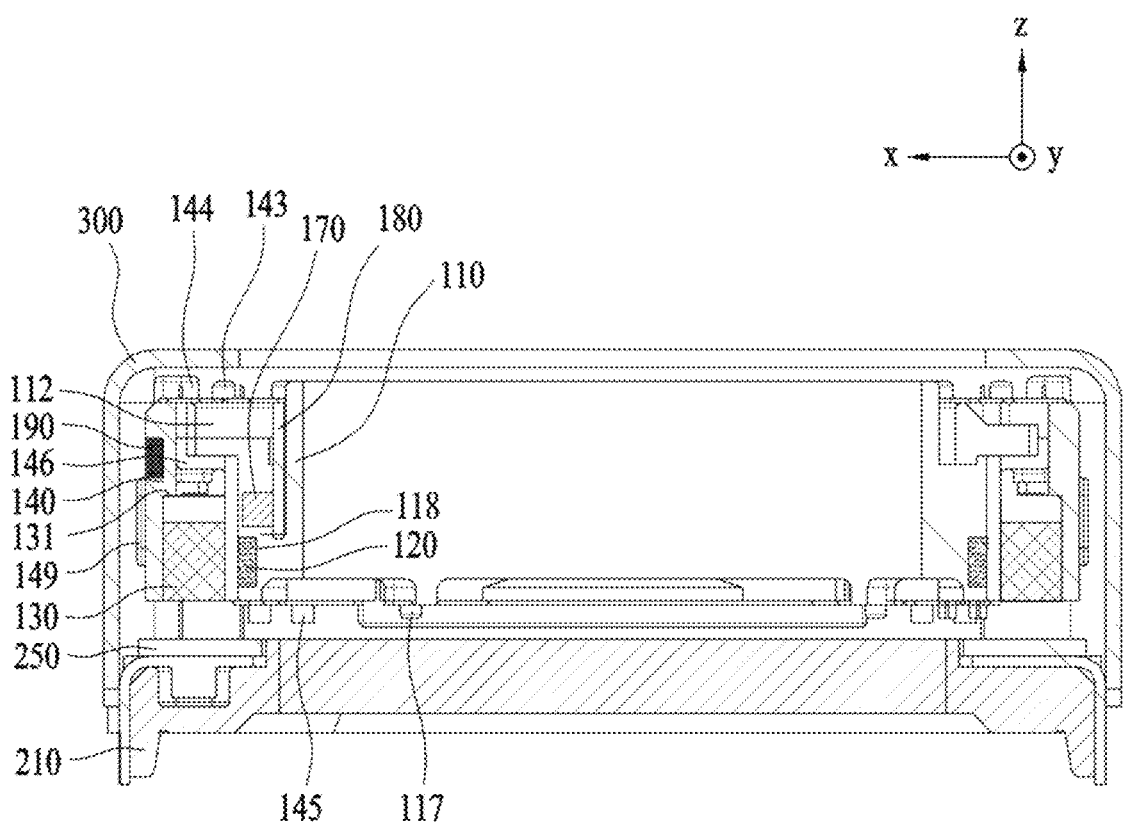
FIG. 8 is a sectional view taken along line I-I' in FIG. 3.

As exemplarily illustrated in FIG. 8, the first coil 120 may be fitted, disposed or secured in a groove 118 formed in the outer circumferential surface 110b of the bobbin 110.

In FIG. 4, although the first coil 120 may be situated directly on the outer circumferential surface 110b of the bobbin 110, the disclosure is not limited thereto. In another example, the first coil 120 may be wound around the bobbin 110 via a coil ring, or may be configured to have the form of an angled ring-shaped coil block. In this case, the coil ring may be coupled to the bobbin 110 in the same manner as the manner in which the sensor board 180 is fitted into the support groove 114 in the bobbin 110.

Figure 5A:
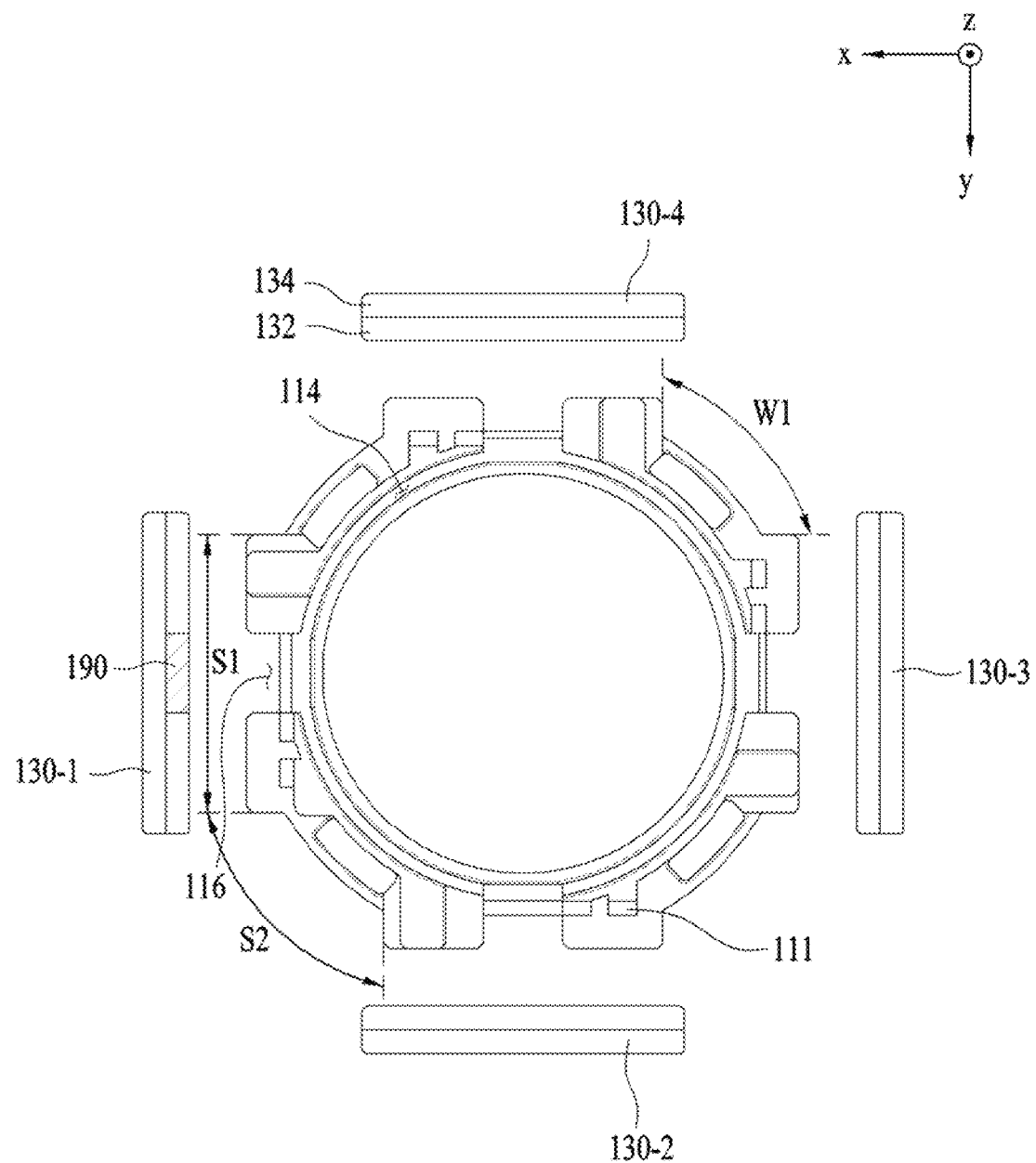
FIG. 5A is a plan view illustrating the bobbin and the second magnet, which are illustrated in FIG. 4.

As illustrated in FIG. 2, the first coil 120 may be configured to have an octagonal shape. The reason for this is because the shape of the first coil 120 is configured to correspond to the shape of the outer circumferential surface 110b of the bobbin 110, which is octagonal, as illustrated in FIG. 5A.

At least four sides of the first coil 120 may be configured to have a linear shape, and the corner portions between the four sides may also be configured to have a linear shape. However, they may also be configured to have a round shape.

The first coil 120 may produce electromagnetic force via electromagnetic interaction between the first coil 120 and the magnet 130 when current is supplied thereto, thereby moving the bobbin 110 in the first direction using the electromagnetic force.

The first coil 120 may be configured to correspond to the second magnet 130. When the second magnet 130 is constituted by a single body such that the surface of the second magnet 130 that faces the first coil 120 has the same polarity, the surface of the first coil 120 that faces the second magnet 130 may also be configured to have the same polarity.

If the second magnet 130 is divided into two or four segments by a plane, which is perpendicular to the optical axis, such that the surface of the magnet 130 that faces the first coil 120 is correspondingly sectioned into two or more surfaces, the first coil 120 may also be divided into a number of coil segments that corresponds to the number of second magnet segments.

Next, the first position sensor 170 and the sensor board 180 will be described.

The first position sensor 170 may be disposed, coupled, or mounted on the bobbin 110 so as to move along with the bobbin 110.

The first position sensor 170 may move along with the bobbin 110 when the bobbin 110 moves in the first direction. The first position sensor 170 may detect the sum of the strength of the magnetic field of the first magnet 190 and the strength of the magnetic field of the second magnet 130 depending on the movement of the bobbin 110, and may form an output signal based on the detected result. The displacement in the optical axis direction of the bobbin 110 or the first direction may be controlled using the output signal from the first position sensor 170.

The first position sensor 170 may be conductively connected to the sensor board 180. The first position sensor 170 may take the form of a driver that includes a Hall sensor, or may take the form of a position detection sensor alone such as, for example, a Hall sensor.

The first position sensor 170 may be disposed, coupled, or mounted on the bobbin 110 in various forms, and may receive current in various ways depending on the manner in which the first position sensor 170 is disposed, coupled, or mounted.

The first position sensor 170 may be disposed, coupled, or mounted on the outer circumferential surface 110*b* of the bobbin 110.

For example, the first position sensor 170 may be disposed, coupled, or mounted on the sensor board 180, and the sensor board 180 may be disposed or coupled to the outer circumference surface 110*b* of the bobbin 110. In other words, the first position sensor 170 may be indirectly disposed, coupled or mounted on the bobbin 110 via the sensor board 180.

The first position sensor 170 may be conductively connected to at least one of the upper elastic member 150 and the lower elastic member 160. For example, the first position sensor 170 may be conductively connected to the upper elastic member 150.

Figure 5B:
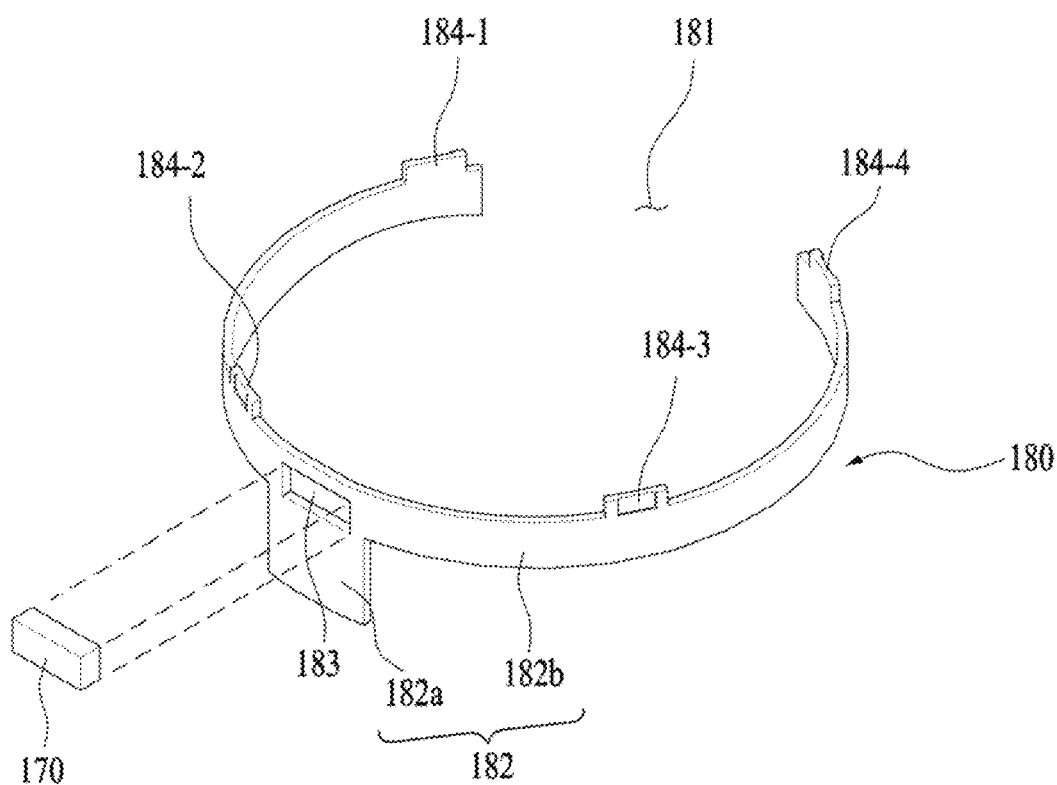
FIG. 5B is an exploded perspective view illustrating the sensor board and the first position sensor, which are illustrated in FIG. 4.
Figure 5C:
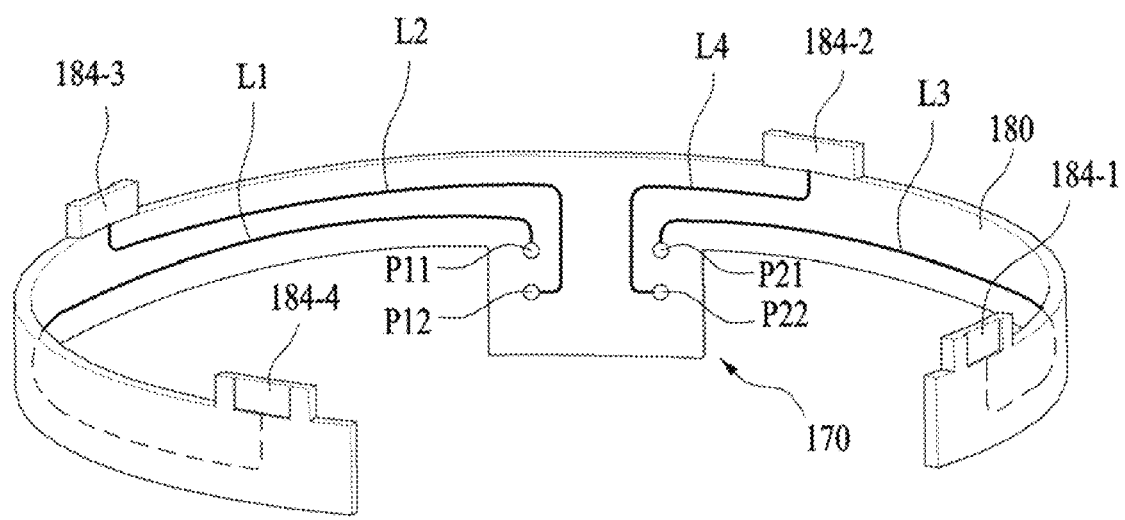
FIG. 5C is a rear perspective view illustrating an embodiment of the sensor board illustrated in FIG. 4.

FIG. 5A is a plan view illustrating the bobbin 110 and the second magnet 130 (130-1, 130-2, 130-3 and 130-4), which are illustrated in FIG. 4. FIG. 5B is an exploded perspective view illustrating the sensor board 180 and the first position sensor 170, which are illustrated in FIG. 4. FIG. 5C is a rear perspective view illustrating the sensor board 180 according to an embodiment, which is illustrated in FIG. 4.

Referring to FIGS. 4 and 5A, the sensor board 180 may be mounted on the bobbin 110, and may move along with the bobbin 110 in the optical axis direction.

For example, the sensor board 180 may be coupled to the bobbin 110 by being fitted or disposed in the support groove 114 in the bobbin 110. The sensor board 180 is sufficient so long as it is mounted on the bobbin 110. Although FIG. 4 illustrates a sensor board 180 having a ring shape, the disclosure is not limited thereto.

The first position sensor 170 may be attached to and supported by the front surface of the sensor board 180 using an adhesive member such as, for example, epoxy or a piece of double-sided tape.

The outer circumferential surface 110*b* of the bobbin 110 may include first side surfaces S1 and second side surfaces S2. The first side surfaces S1 correspond to first side portions 141 of the housing 140 on which the second magnet 130 is disposed. The second side surfaces S2 are located between the first side surfaces S1 so as to connect the first side surfaces S1 to one another.

The first position sensor 170 may be disposed on any one of the first side surfaces S1 of the bobbin 110. For example, the recess 116 in the bobbin 110 may be provided in either one of the first side surfaces S1 of the bobbin 110, and the first position sensor 170 may be located in the recess 116 in the bobbin 110.

Referring to FIG. 5A, the first position sensor 170 may be disposed, coupled, or mounted to an upper portion, a middle portion, or a lower portion of the outer circumferential surface of the sensor board 180 in various forms.

For example, the first position sensor 170 may be disposed on any one of the upper portion, the middle portion and the lower portion of the outer circumferential surface of the sensor board 180 so as to be disposed or directed in the first direction in the space between the first and second magnets 190 and 130 at the initial position of the bobbin 110. The first position sensor 170 may receive current from outside through a circuit of the sensor board 180.

The first position sensor 170 may be disposed, coupled or mounted on the upper portion of the outer circumferential surface of the sensor board 180 so as to be positioned or arranged in the space between the first and second magnets 190 and 130 in the first direction from the initial position of the bobbin 110.

The first position sensor 170 may be disposed on the upper portion of the outer circumferential surface of the sensor board 180 so as to be positioned as far from the first coil 120 as possible such that the first position sensor 170 is not influenced by the magnetic field generated by the first coil 120, thereby inhibiting malfunctions or errors of the first position sensor 170.

As illustrated in FIG. 5B, for example, the sensor board 180 may have a mounting recess 183 formed in the upper portion of the outer circumferential surface thereof, and the first position sensor 170 may be disposed, coupled or mounted in the mounting recess 183 in the sensor board 180.

In order to allow more efficient injection of epoxy or the like for assembly of the first position sensor 170, at least one surface of the mounting recess 183 of the sensor board 180 may be provided with an inclined surface (not shown). Although additional epoxy or the like may not be injected into the mounting recess 183 in the sensor board 180, it may be possible to increase the force with which the first position sensor 170 is disposed, coupled or mounted by injecting epoxy or the like into the mounting recess 183.

The sensor board 180 may include a body 182, elastic member contact portions 184-1 to 184-4, and a circuit pattern L1-L4.

When the support groove 114 in the bobbin 110 has the same shape as that of the outer circumferential surface of the bobbin 1100, the body 182 of the sensor board 180, which is fitted into the support groove 114 of the bobbin 110, may have a shape which is capable of being fitted into the groove 114 and being secured thereto.

Although the support groove 114 in the bobbin 110 and the body 182 of the sensor board 180 may have a circular shape when viewed in a plan view, as illustrated in FIGS. 3 to 5A, the disclosure is not limited thereto. In another embodiment, the support groove 114 in the bobbin 110 and the body 182 of the sensor board 180 may have a polygonal shape when viewed in a plan view.

Referring to FIG. 5B, the body 182 of the sensor board 180 may include a first segment 182*a*, on which the first position sensor 170 is disposed, coupled, or mounted, and a second segment 182*b*, which extends from the first segment 182*a* and which is fitted into the support groove 114 in the bobbin 110.

Although the sensor board 180 may have an opening 181 in the portion thereof that faces the first segment 182*a* so as to be easily fitted into the support groove 114 in the bobbin 110, the disclosure is not limited to any specific structure of the sensor board 180.

The elastic member contact portions 184-1 to 184-4 of the sensor board 180 may protrude from the body 182 of the sensor board 180 in, for example, the optical axis direction or the first direction in which the contact portions can come into contact with the first inner frame 151.

The elastic member contact portions 184-1 to 184-4 of the sensor board 180 may be connected to the first inner frame 151 of the upper elastic member 150.

The circuit pattern L1-L4 of the sensor board 180 may be formed on the body 182 of the sensor board 180, and may conductively connect the first position sensor 170 and the elastic member contact portions 184-1 to 184-4 to each other.

The first position sensor 170 may be embodied as a Hall sensor, for example, but may be embodied as any sensor as long as it is able to detect the intensity of a magnetic field. If the first position sensor 170 is embodied as a Hall sensor, the hall sensor may include a plurality of pins.

For example, the plurality of pins may include input pins P11 and P12 and output pins P21 and P22. Signals output through the output pins P21 and P22 may be a current type or a voltage type.

The input pins P11 and P12 and the output pins P21 and P22 of the first position sensor 170 may be conductively connected to the respective elastic member contact portions 184-1 to 184-4 via the circuit pattern L1 to L4.

For example, referring to FIG. 5C, the first line L1 of the circuit pattern may conductively connect the first pin P11 to the fourth elastic member contact portion 184-4, and the second line L2 of the circuit pattern may conductively connect the second input pin P12 to the third elastic member contact portion 184-3. In addition, the third line L3 of the circuit pattern may conductively connect the first output pin P21 to the first elastic member contact portion 184-1, and the fourth line L4 of the circuit pattern may conductively connect the second output pin P22 to the second elastic member contact portion 184-2.

In an embodiment, the first to fourth lines L1 to L4 may be formed so as to be visible to the naked eye. In another embodiment, the first to fourth lines L1 to L4 may be formed in the body 182 of the sensor board 180 so as not to be visible to the naked eye.

Next, the housing 140 will be described.

The housing 140 may support the first magnet 190 for detection and the magnet 130 for driving, and may accommodate the bobbin 110 therein such that the bobbin 110 is allowed to move in the first direction.

The housing 140 may generally have a hollow column shape. For example, the housing 140 may have a polygonal (e.g., a square or octagonal) or circular bore.

Figure 6:
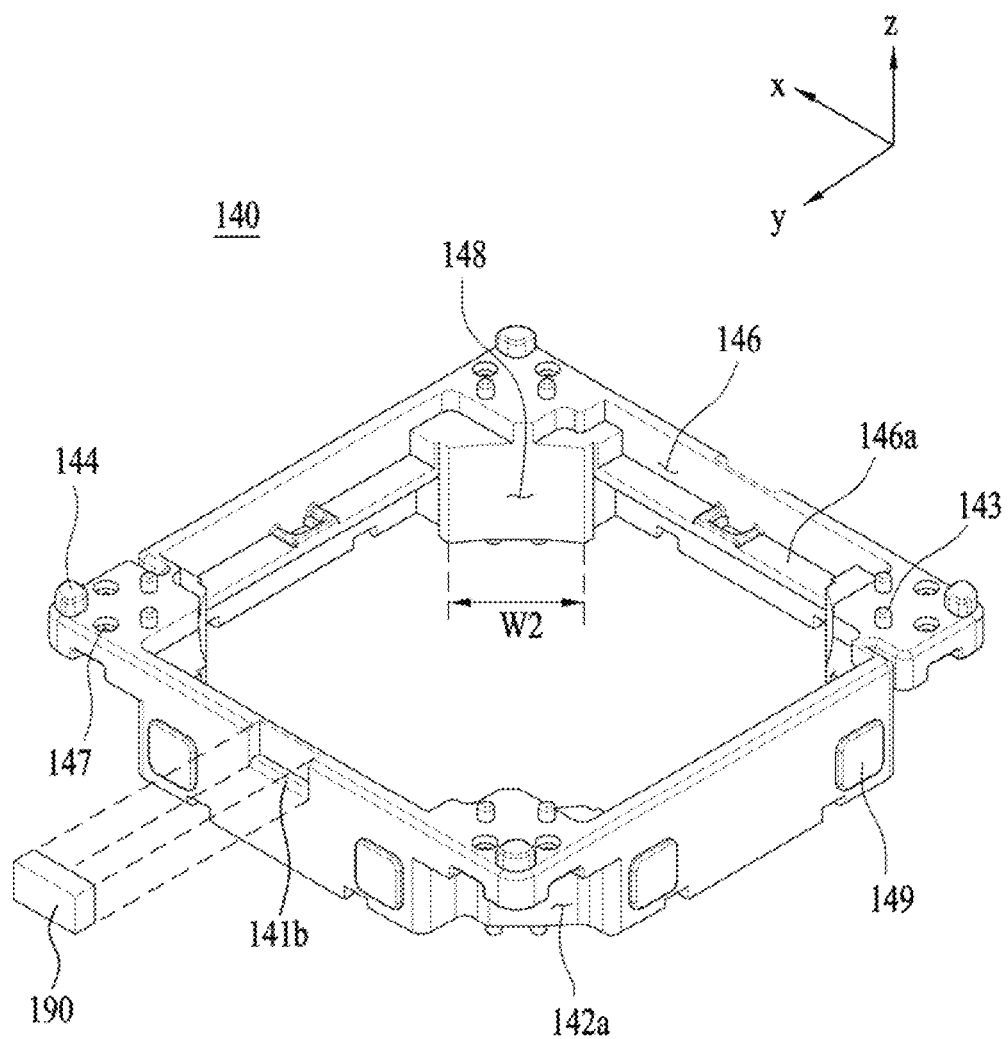
FIG. 6 is a top perspective view of the housing illustrated in FIG. 1.
Figure 7:
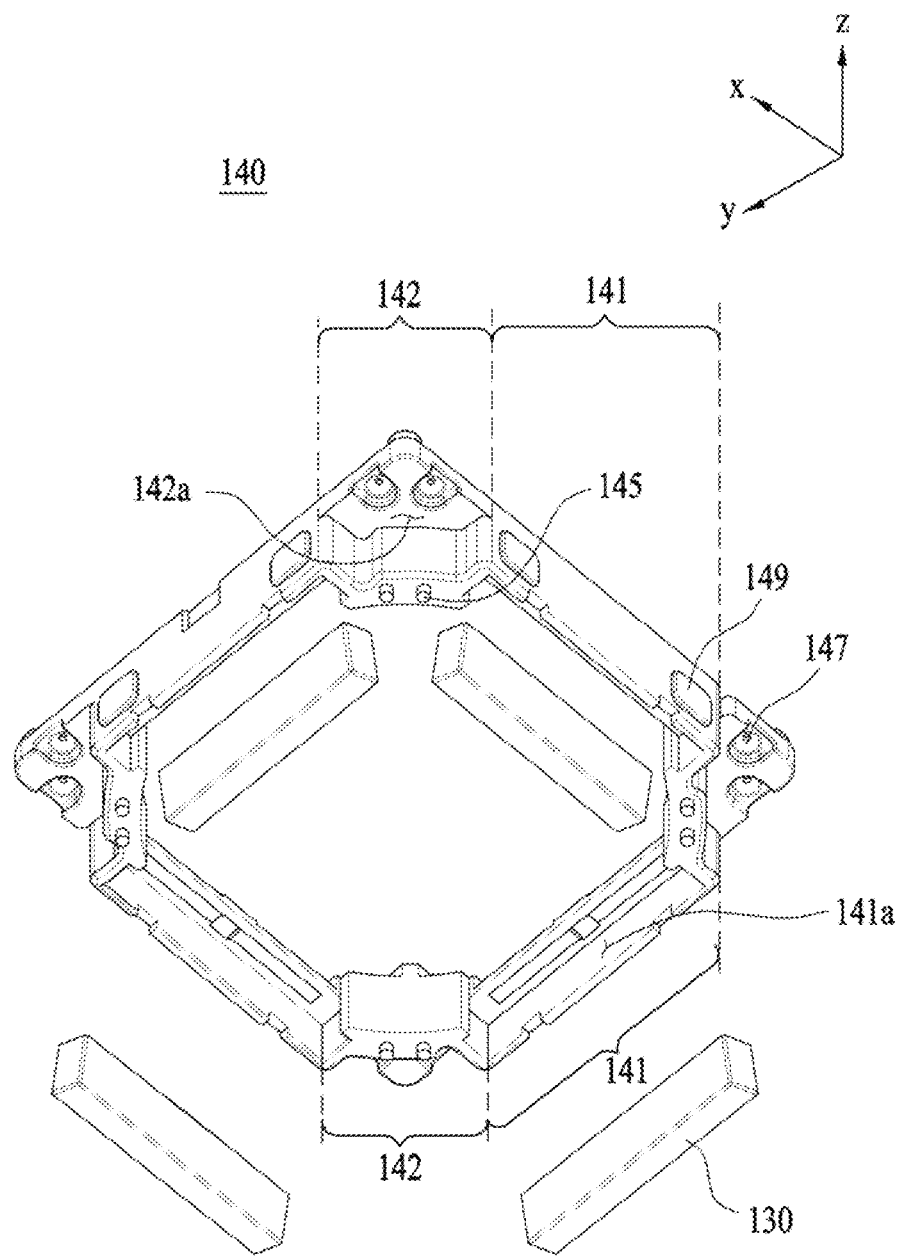
FIG. 7 is a bottom exploded perspective view of the housing, the first magnet, and the second magnet, which are illustrated in FIG. 2.
Figure 9:
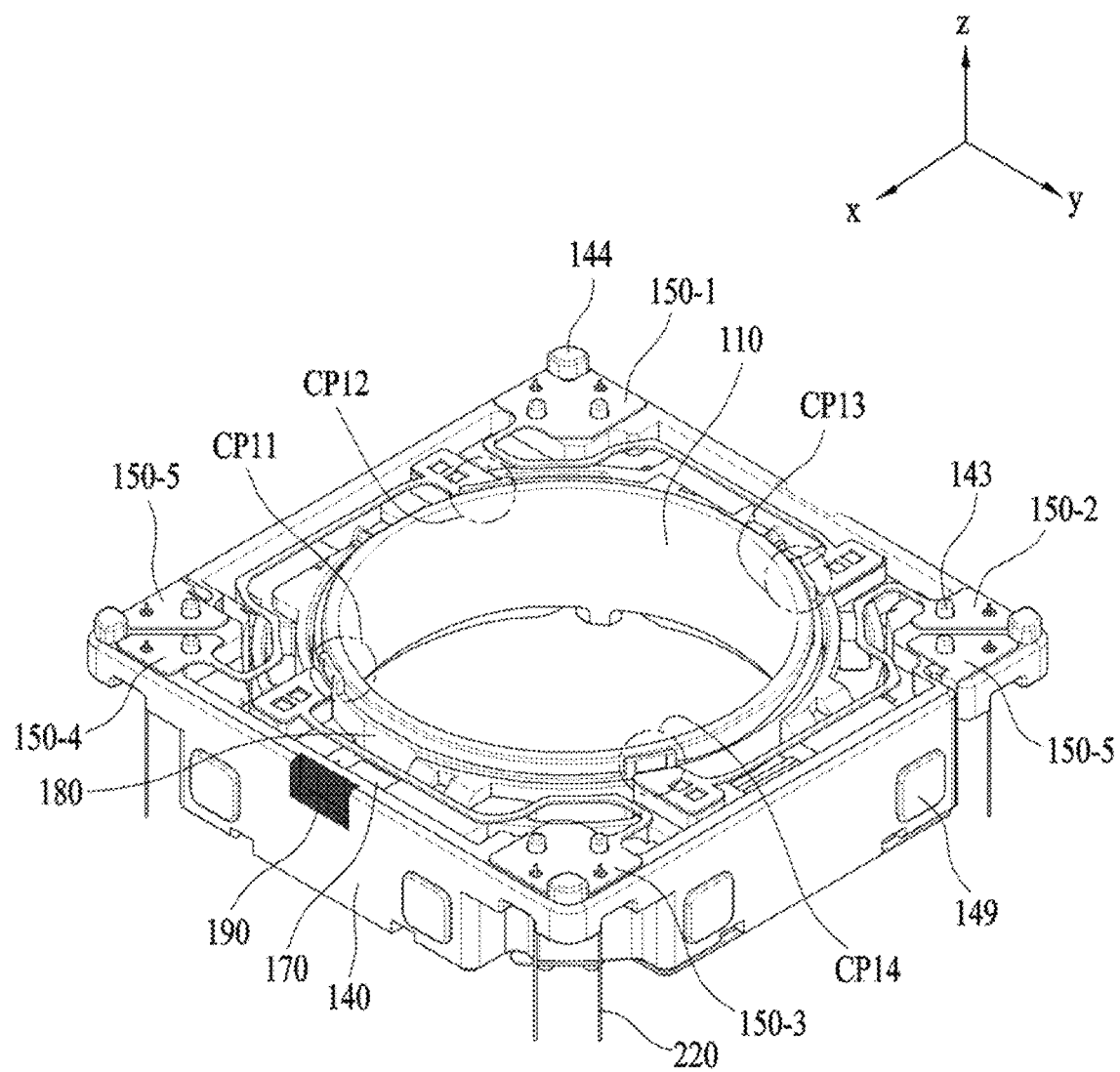
FIG. 9 is a plan perspective view illustrating the coupled state of the bobbin, the housing, the upper elastic member, the first position sensor, the sensor board, and the plurality of support members, which are illustrated in FIG. 2.
Figure 10:
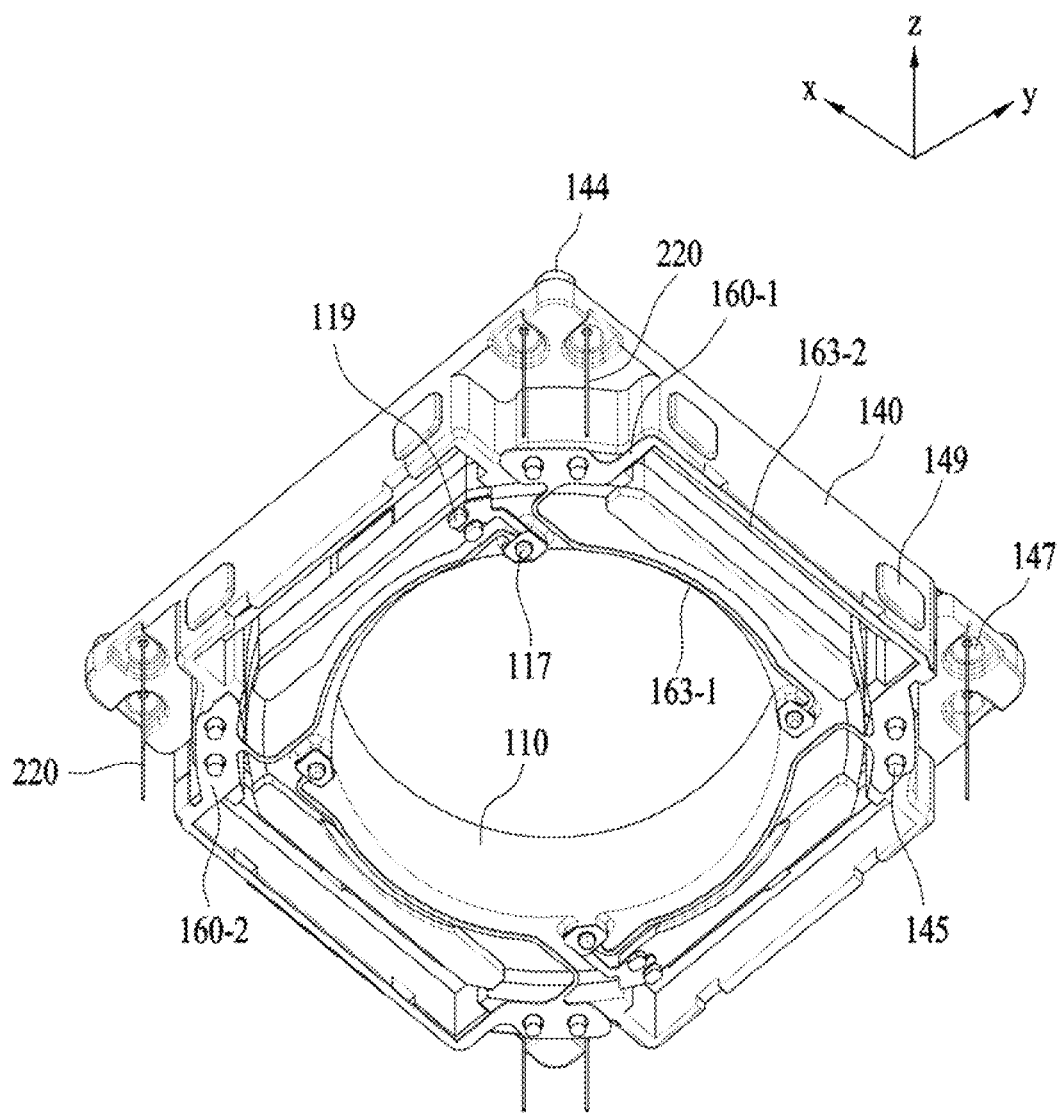
FIG. 10 is a bottom perspective view illustrating the coupled state of the bobbin, the housing, the lower elastic member, and the plurality of support members, which are illustrated in FIG. 2.

FIG. 6 is a top perspective view of the housing 140 illustrated in FIG. 2. FIG. 7 is a bottom exploded perspective view of the housing 140, the first magnet 190 and the second magnet 130, which are illustrated in FIG. 2. FIG. 8 is a sectional view taken along line I-I' in FIG. 3. FIG. 9 is a top perspective view of the coupled state of the bobbin 110, the housing 140, the upper elastic member 150, the first position sensor 170, the sensor board 180, and the support members 220, which are illustrated in FIG. 2. FIG. 10 is a bottom perspective view of the coupled state of the bobbin 110, the housing 140, the lower elastic member 160, and the support members 220, which are illustrated in FIG. 2.

The housing 140 may have the first seating groove 146 formed at a position thereof corresponding to the first and second protrusions 111 and 112 of the bobbin 110.

The housing 140 may include a third protrusion 148, which corresponds to the space defined between the first and second protrusions 111 and 112, and which has a first width W1.

The third protrusion 148 of the housing 140, which is opposite to the bobbin 110, may have a surface having the same shape as the side portion of the bobbin 110. Here, there may be a predetermined difference between the first width W1 between the first and second protrusions 111 and 112 of the bobbin 110, which is illustrated in FIG. 4, and the second width W2 of the third protrusion 148 of the housing 140, which is illustrated in FIG. 4. Consequently, it is possible to restrict the rotation of the third protrusion 148 between the first and second protrusions 111 and 112 of the bobbin 110. As a result, it is possible for the third protrusion 148 of the housing 140 to inhibit the bobbin 110 from being rotated even if the bobbin 110 receives force in the direction in which the bobbin 110 is rotated about the optical axis, rather than being rotated in the optical axis direction.

For example, the upper edge of the outer periphery of the housing 140 may have a square plan shape, whereas the lower edge of the inner periphery may have an octagonal plan shape, as exemplarily illustrated in FIGS. 6 and 7. The housing 140 may include a plurality of side portions. For example, the housing 140 may include four first side portions 141 and four second side portions 142, and the width of each of the first side portions 141 may be greater than the width of each of the second side portions 142.

The first side portions 141 of the housing 140 may correspond to the portions on which the second magnet 130 is mounted. Each of the second side portions 142 of the housing 140 may be disposed between the two adjacent first side portions 141, and may correspond to portions on which the support members 220 are disposed. Each of the first side portions 141 of the housing 140 may connect the two adjacent second side portions 142 of the housing 140, and may have flat surfaces having a predetermined depth.

Each of the first side portions 141 of the housing 140 may have a surface area that is equal to or larger than the surface area of the second magnet 130, which corresponds to the first side portion 141.

The housing 140 may have a first magnet seat 141b for accommodating the first magnet 190 and second magnet seats 141a for accommodating the second magnets 130-1 to 130-4.

For example, the housing 140 may have the first magnet seat 141b, which is formed in the upper end of the outer portion of one of the first side portions 141, and the second magnet seats 141a, which are formed in the lower end of the inner portion of the first side portions 141.

The first magnet seat 141b may be positioned above the second magnet seats 141a.

The first magnet 190 may be fitted in and secured to the first magnet seat 141b, and each of the second magnets 130-1 to 130-4 may be fixed to the second magnet seat 141a, which is provided on a corresponding one of the first side portions 141 of the housing 140.

The second magnet seat 141a of the housing 140 may be configured to have the form of a recess having a size corresponding to the size of the magnet 130, and may be configured to face at least three of the surfaces of the second magnet 130, that is, two lateral side surface and the upper surface of the second magnet 130.

An opening may be formed in the bottom surface of the second magnet seat 141a of the housing 140, that is, the surface that is opposite the second coil 230, which will be described later, and the bottom surface of the second magnet 130 seated on the second magnet seat 141a may directly face the second coil 230.

The first and second magnets 190 and 130 may be secured to the first and second magnet seats 141b and 141a of the housing 140 using an adhesive, without being limited thereto, and an adhesive member such as a piece of double-sided tape may be used.

Alternatively, the first and second magnet seats 141b and 141a of the housing 140 may be configured as mounting holes, which allow the first and second magnets 190 and 130 to be partially fitted thereinto or to be partially exposed therefrom, rather than being configured as the recess illustrated in FIGS. 6 and 7.

For example, the first magnet 190 may be positioned above one (for example, 130-1) of the second magnets 130-1, 130-2, 130-3 and 130-4.

The first magnet 190 may be disposed so as to be spaced apart from the second magnet (for example, 130-1). The housing 140 may be partially disposed between the first magnet 190 and the second magnet (for example, 130-1). In another embodiment, the first magnet 190 and the second magnet 130-1 may be in contact with each other.

The first side portion 141 of the housing 140 may be oriented parallel to the side surface of the cover member 300. In addition, the first side portion 141 of the housing 140 may be larger than the second side portion 142. The second side portion 142 of the housing 140 may be provided with paths through which the support members 220 extend. First through-holes 147 may be formed in the upper portion of the second side portion 142 of the housing 140. The support members 220 may be connected to the upper elastic member 150 through the first through holes 147.

In addition, in order to inhibit the housing 140 from directly colliding with the inner side surface of the cover member 300 illustrated in FIG. 1, the housing 140 may be provided at the upper end thereof with a second stopper 144.

The housing 140 may include at least one first upper support protrusion 143, formed on the upper surface thereof for the coupling of the upper elastic member 150.

For example, the first upper support protrusion 143 of the housing 140 may be formed on the upper surface of the second side portion 142 of the housing 140. The first upper support protrusion 143 of the housing 140 may have a semispherical shape, as illustrated in the drawings, or may have a cylindrical shape or a prism shape, without being limited thereto.

The housing 140 may have second a lower support protrusion 145 formed on the lower surface thereof for the coupling and fixing of the lower elastic member 160.

In order to define paths for the passage of the support members 220 and to ensure the space to be filled with gel-type silicone, which serves as a damper, the housing 140 may have a first recess 142a formed in the second side portion 142. In other words, the first recess 142a of the housing 140 may be filled with damping silicone.

The housing 140 may have a plurality of third stoppers 149 protruding from the side portions 141 thereof. The third stoppers 149 serve to inhibit the housing 140 from colliding with the cover member 300 when the housing 140 moves in the second and third directions.

In order to inhibit the bottom surface of the housing 140 from colliding with the base 210 and/or the circuit board 250, which will be described below, the housing 140 may further have a fourth stopper (not shown) protruding from the bottom surface thereof. Through this configuration, the housing 140 may be spaced apart from the base 210, which is disposed thereunder, and may be spaced apart from the cover member 300, which is disposed thereabove, with result that the housing 140 may be maintained at a predetermined position in the optical axis direction without interference therebetween. In this way, the housing 140 may perform a shifting action in the second and third direction, that is, the anteroposterior direction and the lateral direction, on a plane perpendicular to the optical axis.

Next, the first magnet 190 and the second magnet 130 will be described.

The second magnet 130 may be disposed on the second magnet seat 141a of the housing 140 so as to overlap the first coil 120 in the direction perpendicular to the optical axis.

In another embodiment, the first and second magnets 190 and 130 may be disposed together outside or inside the first side portion 141 of the housing 140, or may be disposed together inside or outside the second side portion 142 of the housing 140.

In a further embodiment, the first magnet 190 may be accommodated in the inner portion of the first side portion 141 of the housing 140, and the second magnet 130 may be accommodated in the outer portion of the first side portion 141 of the housing 140.

The second magnet 130 may have a form that corresponds to the first side portion 141 of the housing 140, that is, the form of an approximately rectangular parallelepiped. The surface of the second magnet 130 that faces the first coil 120 may have a radius of curvature that corresponds to that of the first coil 120.

The second magnet 130 may be configured as a single body. In the embodiment, referring to FIG. 5A, the second magnet 130 may be oriented such that the surface thereof facing the first coil 120 is the S-pole 132 and the opposite surface is the N-pole 134, without being limited thereto, and the opposite configuration is also possible.

At least two second magnets 130 may be provided, and in the embodiment, four second magnets 130 may be installed. The second magnet 130 may have an approximately rectangular shape, as illustrated in FIG. 5A, or may have a triangular or diamond shape.

Although the surface of the second magnet 130 that faces the first coil 120 may be linear, the disclosure is not limited thereto. When the corresponding surface of the first coil 120 is curved, the surface of the second magnet 130 that faces the first coil 120 may be curved so as to have a radius of curvature corresponding to the surface of the first coil 120.

By virtue of this configuration, it is possible to keep the distance between the second magnet 130 and the first coil 120 constant. In an embodiment, four first side portions 141 of the housing 140 may be provided with the second magnets 130-1, 130-2, 130-3 and 130-4, respectively, without being limited thereto. In some designs, only one of the second magnet 130 and the first coil 120 may have a flat surface, and the other of the second magnet 130 and the first coil 120 may have a curved surface. Alternatively, both the first coil 120 and the second magnet 130, which face each other, may have curved surfaces. In this case, the surface of the first coil 120 may have the same radius of curvature as the surface of the second magnet 130.

When the second magnets 130 have a rectangular flat surface, as illustrated in FIG. 5A, a pair of magnets, among the plurality of magnets 130, may be arranged in the second direction so as to be parallel to each other, and the other pair of magnets may be arranged in the third direction so as to be parallel to each other. By virtue of the arrangement, it is possible to control the movement of the housing 140 for handshake compensation, which will be described later.

Next, the upper elastic member 150, the lower elastic member 160, and the support members 220 will be described.

The upper elastic member 150 and the lower elastic member 160 elastically support the bobbin 110. The support members 220 may support the housing 140 so as to be movable relative to the base 210 in the direction perpendicular to the optical axis, and may conductively connect at least one of the upper and lower elastic members 150 and 160 to the circuit board 250.

Figure 11:
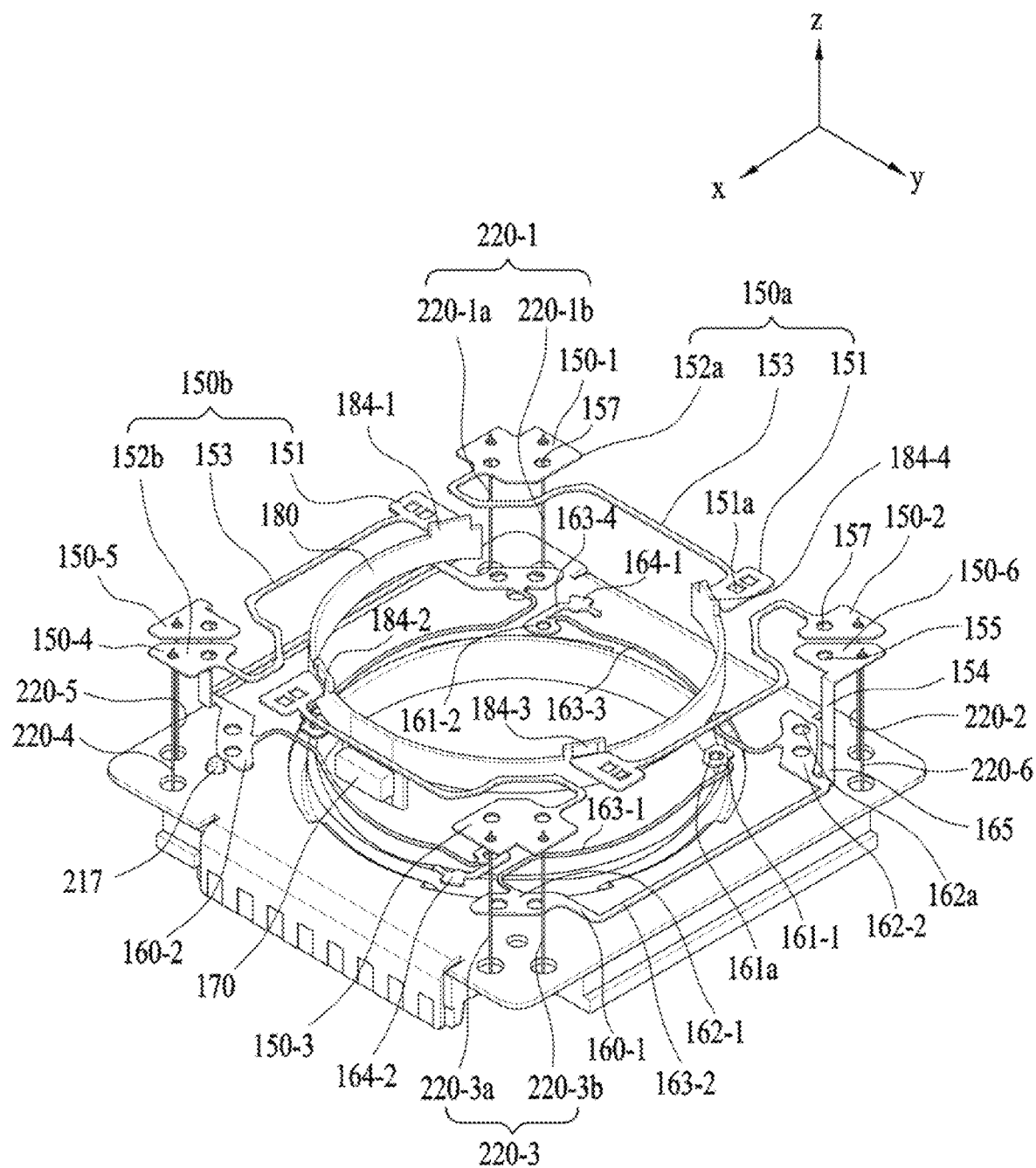
FIG. 11 is an assembled perspective view illustrating the upper elastic member, the lower elastic member, the first position sensor, the sensor board, the base, the support members, and the circuit board, which are illustrated in FIG. 2.

FIG. 11 is an assembled perspective view illustrating the upper elastic member 150, the lower elastic member 160, the first position sensor 170, the sensor board 180, the base 210, the support members 220, and the circuit board 250, which are illustrated in FIG. 2.

The upper elastic member 150 may include a plurality of upper elastic members 150-1 to 150-4, which are conductively separated and spaced apart from one another.

The elastic member contact portions 184-1 to 184-4 of the sensor board 180 may be conductively connected to at least one of the upper elastic member 150 and the lower elastic member 160.

For example, although FIG. 11 illustrates that the elastic member contact portions 184-1 to 184-4 of the sensor board 180 come into electrical contact with the upper elastic members 150-1 to 150-4, the disclosure is not limited thereto. In another embodiment, the elastic member contact portions 184-1 to 184-4 of the sensor board 180 may come into electrical contact with the lower elastic member 160, or may come into electrical contact with both the upper elastic member 150 and the lower elastic member 160.

Each of the respective elastic member contact portions 184-1 to 184-4 of the sensor board 180, which are conductively connected to the first position sensor 170, may be conductively connected to a corresponding one of the upper elastic members 150-1 to 150-4. Each of the upper elastic members 150-1 to 150-4 may be conductively connected to a corresponding one of the support members 220-1 to 220-4.

Each one 150a of the first and third upper elastic members 150-1 and 150-3 may include a first inner frame 151, a first outer frame 152a, and a first frame connector 153.

Each one 150b of the second and fourth upper elastic members 150-2 and 150-4 may include the first inner frame 151, a first outer frame 152b, and the first frame connector 153.

The first inner frame 151 of the first to fourth upper elastic members 150-1 to 150-4 may be coupled to a corresponding one of the bobbin 110 and the elastic member contact portions 184-1 to 184-4.

As illustrated in FIG. 4, when the upper surface 112a of the second protrusion 112 of the bobbin 110 is flat, the first inner frame 151 of the upper elastic member 150 may be placed on the upper surface 112a of the second protrusion 112 of the bobbin 110, and may be secured thereto using an adhesive member.

The first outer frame 152a and 152b may be coupled to the housing 140, and may be connected to the support members 220. The first frame connector 153 of each of the upper elastic members 150-1 to 150-4 may connect the first inner frame 151 to the first outer frame 152a or 152b. Although the first outer frame 152b may be formed by bisecting the first outer frame 152a, the disclosure is not limited thereto. In another embodiment, the first outer frame 152a may be bisected so as to have the same shape as the first outer frame 152b.

The first frame connector 153 may be bent at least one time so as to form a predetermined pattern. Upward and/or downward movement of the bobbin 110 in the first direction may be elastically supported via positional variation and fine deformation of the first frame connector 153.

The first outer frame 152a or 152b of the upper elastic member 150 illustrated in FIG. 11 may be coupled and secured to the housing 140 by means of the first upper support protrusion 143 of the housing 140. In the embodiment, each of the first outer frames 152a and 152b may be formed with a second of second through-hole 157, which has a shape and position corresponding to those of the first upper support protrusion 143. Here, the first upper support protrusion 143 and the second of second through-hole 157 may be fixed to each other via thermal fusion, or using an adhesive such as, for example, epoxy.

By virtue of conductive connections between the elastic member contact portions 184-1 to 184-4 of the sensor board 180 and the first to fourth upper elastic members 150-1 to 150-4, four pins P11 to P22 of the first position sensor 170 may be conductively connected to the first to fourth upper elastic members 150-1 to 150-4.

The respective first to fourth upper elastic members 150-1 to 150-4 may be connected to the circuit board 250 via the support members 220. That is, the first upper elastic members 150-1 may be conductively connected to the circuit board 250 via at least one of the first of first and second of first support members 220-1a and 220-1b, and the second upper elastic members 150-2 may be conductively connected to the circuit board 250 via the second support members 220-2. The third upper elastic members 150-3 may be conductively connected to the circuit board 250 via at least one of the first of third and second of third support members 220-3a and 220-3b, and the fourth upper elastic members 150-4 may be conductively connected to the circuit board 250 via the fourth support members 220-4.

The first position sensor 170 may receive a drive signal, for example, driving current or driving voltage, from the circuit board 250 through two of the first to fourth upper elastic members 150-1 to 150-4 and the support members connected to the upper elastic members (for example, 220-1 and 220-2).

In addition, the first position sensor 170 may output an output signal thereof to the circuit board 250 through the remaining two of the first to fourth upper elastic members 150-1 to 150-4 and the support members connected to the upper elastic members (for example, 220-3 and 220-4).

Meanwhile, the lower elastic member 160 may include first and second lower elastic members 160-1 and 160-2, which are conductively separated and spaced apart from each other. The first coil 120 may be connected to the support members 220 through the first and second lower elastic members 160-1 and 160-2.

Each of the first and second lower elastic members 160-1 and 160-2 may include at least one second inner frame 161-1 or 161-2, at least one second outer frame 162-1 or 162-2, and at least one second frame connector 163-1 or 163-2.

The second inner frames 161-1 and 161-2 may be coupled to the bobbin 110, and the second outer frames 162-1 and 162-2 may be coupled to the housing 140.

The first of second frame connector 163-1 may connect the second inner frame 161-1 and the second outer frame 162-1 to each other, the second of second frame connector 163-2 may connect the second inner frame 161-2 and the second outer frame 162-2 to each other, and the third of second frame connector 163-3 may connect the second inner frame 161-2 and the second outer frame 162-2 to each other.

The first lower elastic member 160-1 may further include a first coil frame 164-1, and the second lower elastic member 160-2 may further include the second coil frame 164-2.

Referring to FIG. 11, each of the first and second coil frames 164-1 and 164-2 of the lower elastic member 160 may be connected to a corresponding one of two ends of the first coil 120. The first and second lower elastic members 160-1 and 160-2 may receive drive signals, for example drive current, from the circuit board 250, and may transfer the drive current to the first coil 120.

Each of the first and second lower elastic members 160-1 and 160-2 may further include a fourth of second frame connector 163-4. The fourth of second frame connector 163-4 may connect the coil frame 164 to the second inner frame 161-2.

At least one of the first of second to fourth of second frame connectors 163-1 to 163-4 may be bent once or more so as to define a predetermined pattern. In Particular, by positional variation and fine deformation of the first of second and third of second frame connectors 163-1 and 163-3, upward and/or downward movement of the bobbin 110 in the first direction, parallel to the optical axis, may be elastically supported.

In an embodiment, each of the first and second lower elastic members 160-1 and 160-2 may further include a bent portion 165, which is connected to one of the upper elastic members. For example, the bent portion 165 may be bent at the second of second frame connector 163-2 toward the upper elastic member 150 in the first direction.

The upper elastic member 160 may further include fifth and sixth upper elastic members 150-5 and 150-6. The first to sixth upper elastic members 150-1 to 150-6 may be conductively separated and spaced apart from one another.

Each of the fifth and sixth upper elastic members 150-5 and 150-6 may include a connecting frame 154 and a second of first outer frame 1550.

The connecting frame 154 of each of the fifth and sixth upper elastic members 150-5 and 150-6 may be connected to a corresponding one of the first and second lower elastic members 160-1 and 160-2, and may extend in the first direction.

The second of first outer frame 155 may be bent at the connecting frame 154 in the direction perpendicular to the first direction, and may be coupled to the housing 155. The second of first outer frame 155 may be connected to the support member 220.

The fifth upper elastic member 150-5 may be connected to the fifth support member 220-5, and the sixth upper elastic member 150-6 may be connected to the sixth support member 220-6.

For example, the bent portion 165 of each of the first and second lower elastic members 160-1 and 160-2 may be integrally formed with the connecting frame 154 of the fifth or sixth upper elastic member 150-5 or 150-6 and the second of first outer frame 155.

For example, each of the fifth and sixth upper elastic members 150-5 and 150-6 may include the connecting frame 154, which is bent at the second of first outer frame 155 so as to be parallel to the first direction, and each of the first and second lower elastic members 160-1 and 160-2 may include the bent portion 165, which is bent at the second of second frame connector 163-2 so as to be parallel to the first direction. The connecting frame 154 may be connected to the bent portion 165.

The first and second lower elastic members 160-1 and 160-2 may receive drive signals from the circuit board 250 via the fifth and sixth upper elastic members 150-5 and 150-6, which are connected to the support members 220-5 and 220-6, and may transfer the drive signals to the first coil 120. Specifically, the first lower elastic member 160-1 may be connected to the circuit board 250 via the sixth upper elastic member 150-6 and the sixth support member 220-6, and the second lower elastic member 160-2 may be connected to the circuit board 250 via the fifth upper elastic member 150-5 and the fifth support member 220-5.

Although each of the upper and lower elastic members 150 and 160 of the embodiment is divided into two or more parts, in another embodiment, each of the upper and lower elastic members 150 and 160 may not be divided.

The second support protrusion 117 of the bobbin 110 may couple and secure the second inner frame 161-1 or 161-2 of the lower elastic member 160 to the bobbin 110. The second lower support protrusion 145 of the housing 140 may couple and secure the second outer frame 162-1 or 162-2 of the lower elastic member 160 to the housing 140.

Each of the second inner frames 161-1 and 161-2 of the first and second lower elastic members 160-1 and 160-2 may be provided with a third through hole 161a, which is formed at a position corresponding to the first lower support protrusion 117 of the bobbin 110 so as to have a shape corresponding to the first lower support protrusion 117 of the bobbin 110. Here, the first lower support protrusion 117 of the bobbin 110 and the third through hole 161a may be secured to each other via thermal fusion, or using an adhesive member such as epoxy.

Each of the second outer frames 162-1 and 162-2 of the first and second lower elastic members 160-1 and 160-2 may be provided with a fourth through hole 162a at a position corresponding to the second lower support protrusion 145 of the housing 140. Here, the second lower support protrusion 145 of the housing 140 and the fourth through hole 162a may be secured to each other via thermal fusion, or using an adhesive member such as epoxy.

Although each of the upper elastic member 150 and the lower elastic member 160 may be constituted by a leaf spring, the disclosure is not restricted as to the material used for the upper and lower elastic members 150 and 160.

The power may be supplied to the first position sensor 170 via two upper elastic members 150, which are conductively separated from each other, signals output from the first position sensor 170 may be transferred to the circuit board 250 via the other two upper elastic members 150, which are conductively separated from each other, and power may be supplied to the first coil 120 via two lower elastic members 160, which are conductively separated from each other. However, the disclosure is not limited thereto.

In another embodiment, the role of the upper elastic members 150 and the role of the lower elastic members 160 may be exchanged. Specifically, power may be supplied to the first coil 120 via two upper elastic members 150, which are conductively separated from each other, power may be supplied to the first position sensor 170 via two lower elastic members 160, which are conductively separated from each other, and signals output from the first position sensor 170 may be transferred to the circuit board 250 via the other two lower elastic members 160, which are conductively separated from each other. Although this arrangement is not illustrated in the drawings, it will be apparent from the drawings.

Next, the support members 220 will be described.

The plurality of support members 220-1 to 220-6 may be disposed at respective second side portions 142. For example, two support members may be disposed at each of the four second side portions 142.

In another embodiment, only one support member may be disposed at each of two side portions 142 among the four second side portions 142 of the housing 140, and two support members may be disposed at each of the other two side portions 142.

In a further embodiment, the support members 220 may be disposed in the form of a leaf spring at the first side portions of the housing 140.

The support members 220 may conductively connect the upper elastic member 150 and the circuit board 250 to each other. As described above, the support members 220 may form paths through which the power required by the first position sensor 170 and the first coil 120 is transferred, and may form paths through which signals output from the first position sensor 170 are supplied to the circuit board 250.

The support members 220 may be embodied as members for elastic support, for example leaf springs, coil springs, suspension wires or the like. In another embodiment, the support members 220 may be integrally formed with the upper elastic member.

Next, the base 210, the circuit board 250, and the second coil 230 will be described.

The base 210 may have a bore corresponding to the bore of the bobbin 110 and/or the bore of the housing 140, and may have a shape that corresponds to that of the cover member 300, for example, a square shape.

Figure 12:
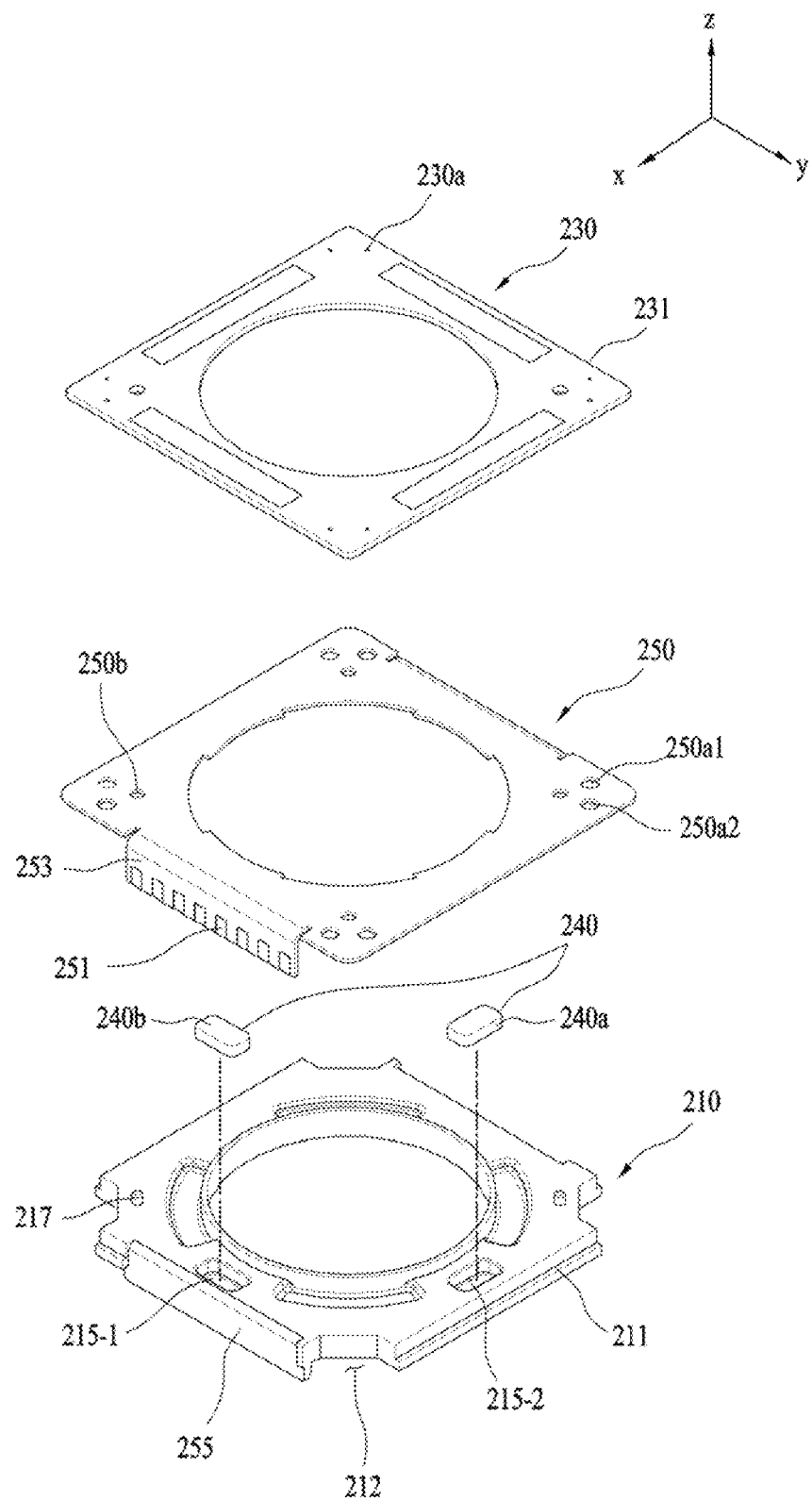
FIG. 12 is an exploded perspective view illustrating the base, the second coil and the circuit board illustrated in FIG. 1.

FIG. 12 is an exploded perspective view of the base 210, the second coil 230, and the circuit board 250, which are illustrated in FIG. 2.

Referring to FIG. 12, the base 210 may have a stepped portion 211, to which an adhesive may be applied when the cover member 300 is secured to the base 210 using the adhesive. Here, the stepped portion 211 may guide the cover member 300 coupled to the upper side thereof, and may be coupled to the end of the cover member 300 in a surface-contact manner.

The stepped portion 211 of the base 210 and the end of the cover member 300 may be attached or secured to each other using, for example, an adhesive.

The base 210 may be provided with a support portion 255 having a corresponding size on the surface thereof facing the terminal 251 of the circuit board 250. The support portion 255 of the base 210 may be formed on the outer side surface of the base 210, which does not have the stepped portion 211, and may support a terminal rib 253 of the circuit board 250.

A second recess 212 may be formed in each corner of the cover member 300. When the cover member 300 has a protrusion formed at each corner thereof, the protrusion of the cover member 300 may be fitted into the second recess 212 in the base 210.

In addition, seating recesses 215-1 and 215-2 may be formed in the upper surface of the base 210 so that the second position sensor 240 may be disposed in each of the seating recesses 215-1 and 215-2. In an embodiment, the base 210 may be provided with two seating recesses 215-1 and 215-2, in which the second position sensors 240 may be disposed, so as to detect the extent to which the housing 140 moves in the second and third directions. To this end, although an angle defined between the imaginary lines, which are connected from the centers of the seating recesses 215-1 and 215-2 to the center of the base 1210, may be an angle of 90°, the disclosure is not limited thereto.

The seating recesses 215-1 and 215-2 in the base 210 may be disposed at or near the centers of the respective second coils 230, or the centers of the second coils 230 may coincide with the centers of the second position sensors 240.

The second coil 230 may be disposed above the circuit board 250, and the second position sensor 240 may be disposed under the circuit board 250. The second position sensor 240 may detect displacement of the housing 140 relative to the base 210 in directions (the X-axis or y-axis direction) perpendicular to the optical axis (that is, the z-axis).

The second position sensor 240 may include two sensors 240a and 240b, which are disposed to be perpendicular to each other so as to detect displacement of the housing 140 in the direction perpendicular to the optical axis.

The circuit board 250 may be disposed on the upper surface of the base 210, and may have a bore corresponding to the bore of the bobbin 110, the bore of the housing 140 and/or the bore of the base 210. The outer circumferential surface of the circuit board 250 may have a shape that coincides with or corresponds to the upper surface of the base 210, for example, a square shape.

The circuit board 250 may include at least one terminal rib 253, which is bent at the upper surface thereof and is provided with a plurality of terminals or pins 251, which receive electrical signals from the outside.

In FIG. 12, the second coil 230 is implemented as being provided on the circuit member 231, which is separate from the circuit board 250, without being limited thereto. In another embodiment, the second coil 230 may take the form of a ring-shaped coil block, an FP coil, or a circuit pattern formed on the circuit board 250.

The second coil 230 may have through-holes 230a formed in the circuit member 231. The support members 220 may extend through the through-holes 230a so as to be conductively connected to the circuit board 250.

The second coil 230 is located above the circuit board 250 so as to be opposite the second magnet 130 secured to the housing 140.

Although four second coils 230 may be installed on four sides of the circuit board 250, the disclosure is not limited thereto, and only two second coils may be installed respectively in the second direction and the third direction, or four or more second coils may be installed.

The housing 140 may move in the second direction and/or the third direction via interaction of the magnet 130 and the second coil 230, which are arranged to be opposite each other as described above, thereby performing handshake compensation.

The second position sensor 240 may be embodied as a Hall sensor, or any other sensor may be used as long as it can detect the strength of a magnetic field. For example, the second position sensor 240 may take the form of a driver that includes a Hall sensor, or may be embodied as a position detection sensor alone, such as, for example, a Hall sensor.

A plurality of terminals 251 may be installed on the terminal rib 253 of the circuit board 250. For example, the circuit board 250 may receive drive signals through the plurality of terminals 251 installed on the terminal rib 253, and may supply the drive signals to the first and second coils 120 and 230 and the first and second position sensors 170 and 240. The circuit board 250 may outwardly output signals received from the first and second position sensors 170 and 240.

In the embodiment, although the circuit board 250 may be embodied as a Flexible Printed Circuit Board (FPCB), the disclosure is not limited thereto. The terminals 251 of the circuit board 250 may be directly formed on the surface of the base 210 via, for example, a surface electrode process.

The circuit board 250 may have through holes 250a1 and 250a2 through which the support members 220 extend. The support members 220 may be conductively connected to the respective circuit patterns formed on the bottom surface of the circuit board 250 via soldering or the like.

In another embodiment, the circuit board 250 may not have the through holes 150a1 and 250a2, and the support members 220 may be conductively connected to the respective circuit patterns formed on the upper surface of the circuit board 250 via soldering or the like.

The circuit board 250 may further have a through hole 250b, which is coupled to an upper support protrusion 217 of the base 210. The upper support protrusion 217 of the base 210 and the through hole 250b of the circuit board 250 may be coupled to each other, as illustrated in FIG. 11, and may be secured to each other via an adhesive member such as epoxy.

Generally, as the movable unit moves, the intensity of a magnetic field, which a position sensor for auto-focusing detects, may have a positive value in a first quadrant and a negative value in a third quadrant based on a x-y coordinate system having the origin (0, 0) as a reference point. Here, the reference point may be the point at which the intensity of a magnetic field is zero. In order to facilitate calibration required for driving of auto-focusing, a linear range in the first and third quadrants of a graph, which represents the intensity of a magnetic field as detected by a position sensor for auto-focusing, based on the origin, may be used as a control range for the driving of auto-focusing. The intensity of the magnetic field may be affected by variation in the ambient temperature around a position sensor and a magnet.

Figure 13:
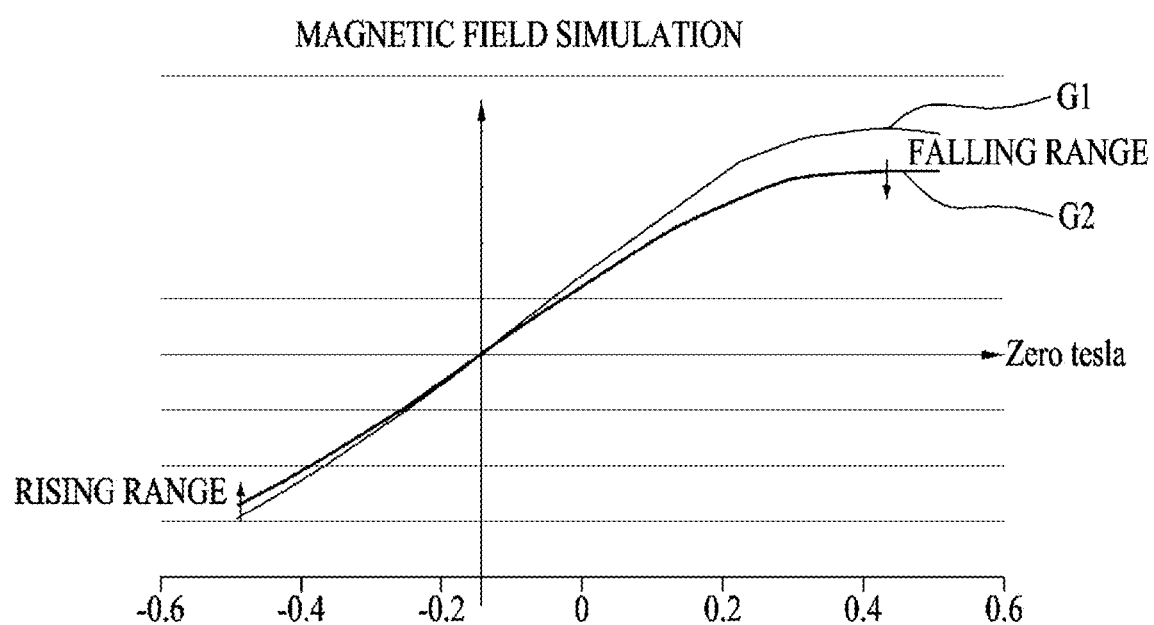
FIG. 13 is a graph illustrating variation in the intensity of a magnetic field relative to variation in ambient temperature.

FIG. 13 illustrates variation in the intensity of a magnetic field relative to variation in ambient temperature.

The horizontal axis (X-axis) represents the distance that the movable unit moves, and the vertical axis (Y-axis) represents the intensity of a magnetic field of a magnet, for example a driving magnet, which is detected by the position sensor for auto-focusing when the movable unit moves.

Graph G1 represents the intensity of a magnetic field of the driving magnet, which is detected by the position sensor for auto-focusing at the ambient temperature when the movable unit moves, and graph G2 represents the intensity of a magnetic field of the driving magnet, which is detected by the position sensor for auto-focusing when the ambient temperature around the position sensor for auto-focusing and the driving magnet rises (for example, to 60° C.). FIG. 13 contains characteristic illustration of the intensity of a magnetic field of the driving magnet and the temperature of the position sensor (for example, a Hall sensor) relative to the temperature of the magnet.

Referring to FIG. 13, it is noted that there is a difference between graph G1 and graph G2.

In the case in which the ambient temperature around the position sensor for auto-focusing rises, as the movable unit moves far away from the reference point at which the intensity of a magnetic field is zero, the graph representing the intensity of a magnetic field in the first quadrant may fall, and the graph representing the intensity of a magnetic field in the third quadrant may rise. In addition, as the movable unit moves far away from the reference point at which the intensity of a magnetic field is zero, the deviation between the intensities of the magnetic field (deviation between G1 and G2) due to temperature variation may increase.

The graph representing the intensity of a magnetic field varies in opposite directions in the first and third quadrants with the increase in temperature. Accordingly, the accuracy and reliability of driving of auto-focusing may decreases when both the first and third quadrants are used as a control range, which is required for driving of auto-focusing.

In order to reduce the effect of the difference in the intensities of the magnetic fields, which is caused by variation in temperature, the embodiment uses only one of the first and third quadrants as the control range for driving auto-focusing. To this end, the first magnet 190, which is an additional detection magnet, is further provided in addition to the second magnet 130, which is a driving magnet.

When the ambient temperature around the movable unit varies, the focal length of a lens mounted on the lens moving apparatus may also be affected. For example, when the ambient temperature around the movable unit rises, the focal length of the lens may increase.

Accordingly, when an auto-focusing motion is performed in the state in which the ambient temperature around the movable unit increases, the lens may become out of focus due to the effect of temperature.

From graph G1 and graph G2 in FIG. 13, it will be appreciated that the graph representing the intensity of a magnetic field is lowered in the first quadrant as the ambient temperature around the movable unit rises.

Since the graph representing the intensity of a magnetic field in the first quadrant is lowered with the variation in temperate, it is possible to automatically compensate for the increase in focal length of the lens due to variation in temperature. For this reason, the embodiment may adopt only the first quadrant as the area of use for a voice coil motor (VCM).

The embodiment may include the first magnet 190 in addition to the second magnet 130. The first position sensor 170 may detect the sum of the intensity of the magnetic field of the second magnet 130 and the intensity of the magnetic field of the first magnet 190.

Figure 14:
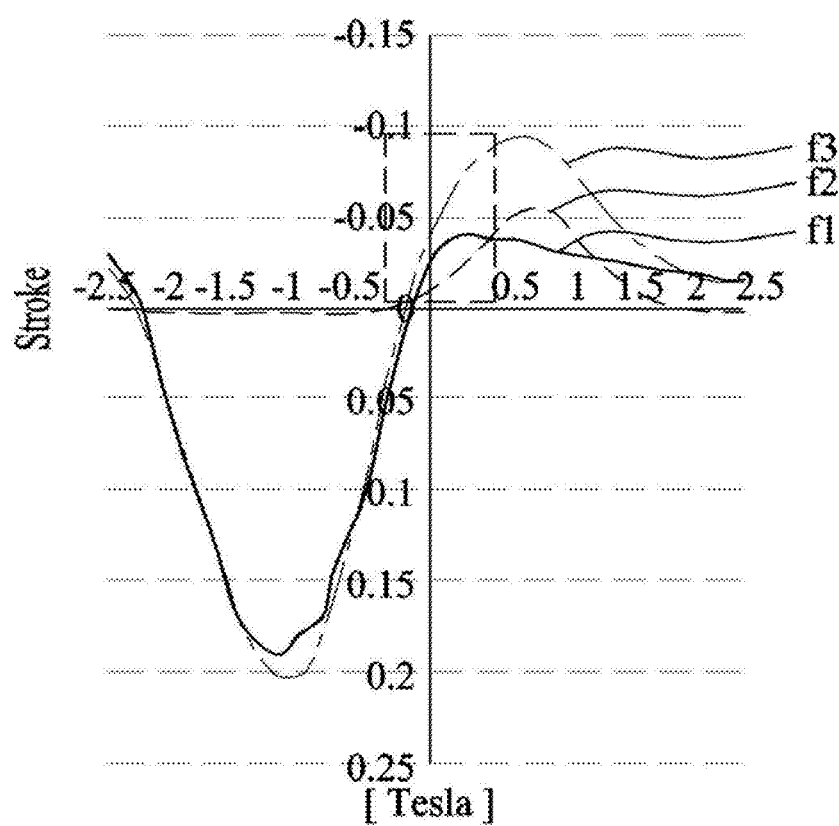
FIG. 14 is a graph illustrating the intensity of a magnetic field of the first magnet, the intensity of a magnetic field of the second magnet, and the sum of the intensities of magnetic fields of the first and second magnets when the movable unit moves.
Figure 15:
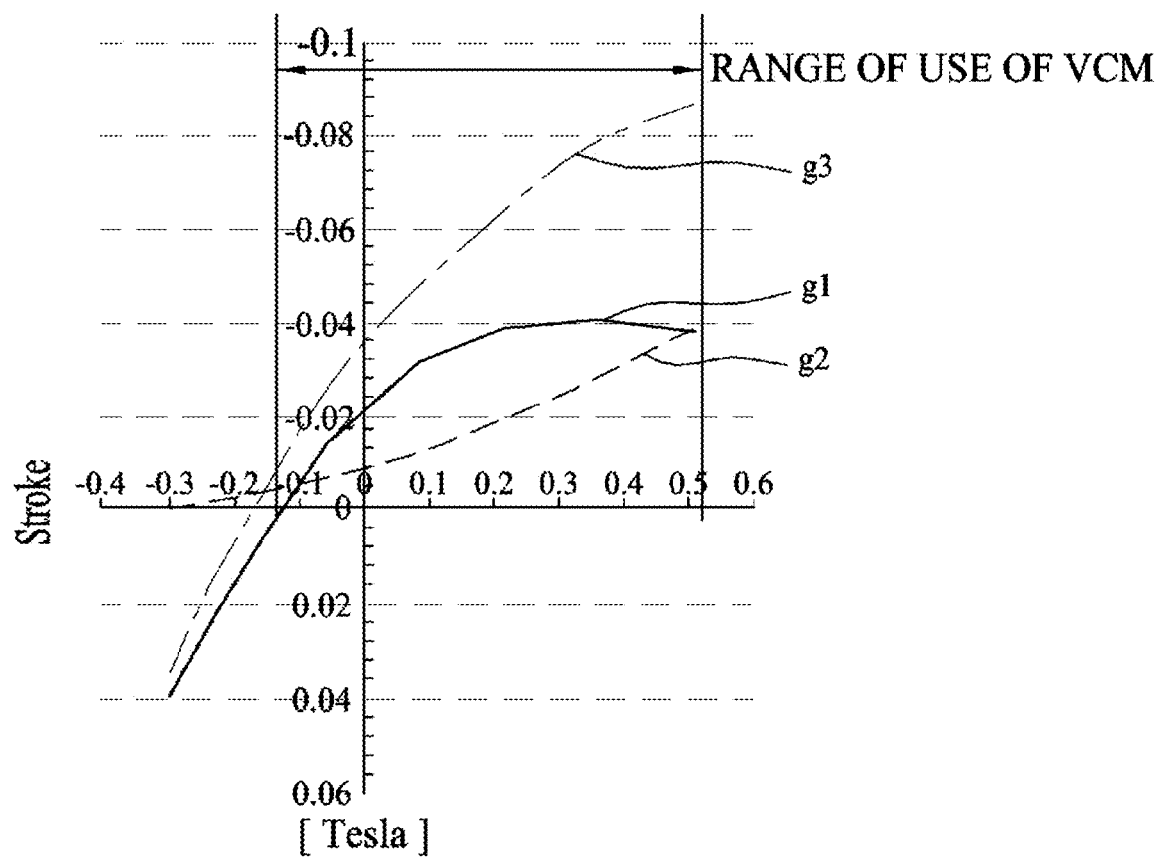
FIG. 15 is a graph illustrating the range of use in the intensity of magnetic field according to an embodiment.

FIG. 14 illustrates the intensity f2 of a magnetic field of the first magnet 190, the intensity f1 of the magnetic field of the second magnet 130, and the sum f3 of the intensity f2 of the magnetic field of the first magnet 190 and the intensity f1 of the magnetic field of the second magnet 130. FIG. 15 illustrates the range of use of the intensity of a magnetic field according to the embodiment. g1 represents the intensity of a magnetic field of the second magnet 130, which is applied to the first position sensor 170, relative to displacement of the movable unit, g2 represents the intensity of a magnetic field of the first magnet 190, which is applied to the first position sensor 170, relative to displacement of the movable unit, and g3 represents the sum of the intensity of a magnetic field of the first magnet 190 and the intensity of a magnetic field of second magnet 130, which are detected by the first position sensor 170, relative to displacement of the movable unit.

Referring to FIGS. 14 and 15, the range in which the sum of the intensities of the magnetic fields, detected by the first position sensor 170 as the bobbin 110 moves, is zero or greater, is set to be the region of use in displacement of the bobbin 110.

Referring to FIG. 15, the range of displacement of the bobbin 110, in which the sum of the intensities of magnetic fields is zero or greater, may be a range of about −0.15 mm to 0.52 mm. For example, assuming that the initial position of the bobbin 110 is the origin, the range of use in displacement of the bobbin 110 with respect to the origin, which is the initial position of the bobbin 110, may be a range of −0.15 mm to 0.52 mm. In the range of use in displacement of the bobbin 110 according to the embodiment (−0.15 mm to 0.52 mm), the intensity of the magnetic field of the first magnet 190 may be positive, the intensity of the magnetic field of the second magnet 130 may be positive, and the sum of the intensity of the magnetic field of the first magnet 190 and the intensity of the magnetic field of the second magnet 130 may be positive.

Figure 16:
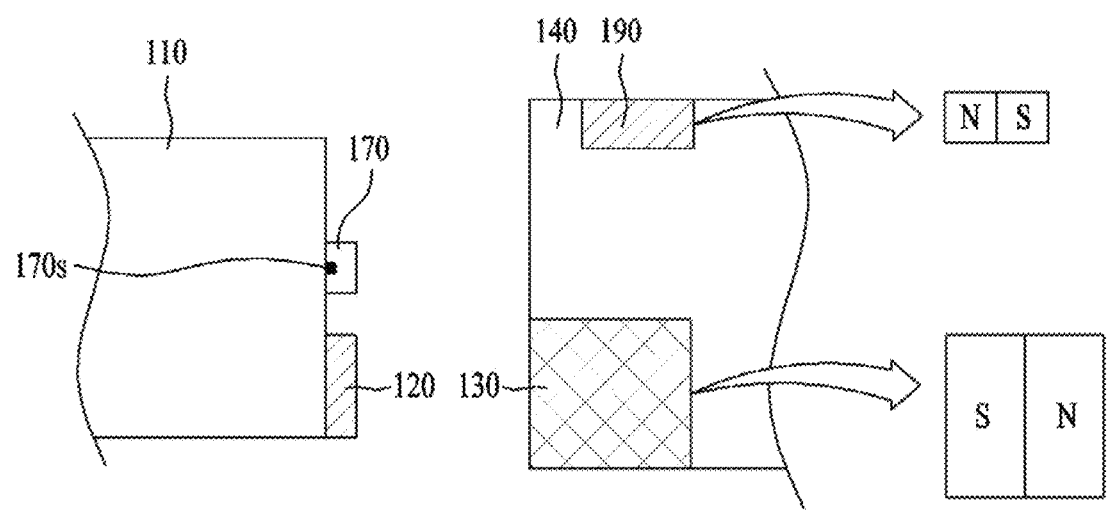
FIG. 16 is a view illustrating the relative positional relationships between the first position sensor, the first magnet and the second magnet at the initial position of the movable unit.

FIG. 16 illustrates the relative positional relationship of the first position sensor 170, the first magnet 190 and the second magnet 130 when the movable unit is disposed at the initial position.

Referring to FIG. 16, the first coil 120 may be disposed at the lower side of the outer circumferential surface of the bobbin 110, and the first position sensor 170 may be disposed at the upper side of the outer circumferential surface of the bobbin 110 so as to be spaced apart from the first coil 120.

The second magnet 130 may be mounted on the housing 140 so as to face the first coil 120. For example, the second magnet 130 may be disposed so at to overlap the first coil 120 in the direction perpendicular to the first direction. The first direction may be the optical axis direction.

The second magnet 130 may be a monopole-magnetized magnet, which has different polarities at the inner and outer sides thereof.

The boundary plane between the S pole and the N pole of the second magnet 130 may be perpendicular to the direction in which the second magnet 130 and the first coil 120 face each other.

For example, the boundary plane between the S pole and the N pole of the second magnet 130 may be oriented in the direction perpendicular to the direction in which the second magnet 130 and the first coil 120 face each other.

For example, although the second magnet 130 may be disposed on the housing 140 such that the surface thereof that faces the first coil 120 is an S pole and the opposite surface thereof is an N pole, the disclosure is not limited thereto, and the reverse disposition is also possible.

The first magnet 190 may be disposed or mounted on the housing 140 so as to be positioned above the second magnet 130. The first magnet 190 may be a monopole-magnetized magnet, which has different polarities at the upper and lower sides thereof.

The boundary plane between the S pole and the N pole of the first magnet 190 disposed on the housing 140 may be parallel to the boundary plane between the S pole and the N pole of the second magnet 130, without being limited thereto. In another embodiment, an imaginary plane parallel to the first boundary plane between the S pole and the N pole of the first magnet 190 disposed on the housing 140 may intersect a second imaginary plane parallel to the second boundary plane between the S pole and the N pole of the second magnet 130.

Although the first magnet 190 may have a smaller size than the second magnet 130, the disclosure is not limited thereto. The first magnet 190 may be disposed at the upper side of the second magnet 130 so as to be spaced apart from the second magnet 130. For example, the first magnet 190 may at least partially overlap the second magnet 130 in the first direction, without being limited thereto.

When the movable unit is located at the initial position, the first position sensor 170 may be disposed on the outer circumferential surface of the bobbin 110 so as to be positioned in or aligned with the space between the second magnet 130 and the first magnet 190 in the first direction.

For example, the movable unit of the lens moving apparatus may move from the initial position in the +z-axis direction or the −z-axis direction due to electromagnetic interaction between the first coil 120 and the second magnet 130.

The movable unit may be an auto-focusing movable unit. The auto-focusing movable unit may include the bobbin 110 and components that are mounted on the bobbin 110 and are moved therewith. For example, the auto-focusing movable unit may include at least the bobbin 110 and a lens (not shown) mounted on the bobbin 110. In some embodiments, the movable unit may further include at least one of the first coil 120 and the first position sensor 170.

The initial position may be the initial position of the movable unit when no power is applied to the first coil 120, or may be the position at which the movable unit is disposed when the upper and lower elastic members 150 and 160 are elastically deformed by only the weight of the movable unit. At the initial position, the movable unit, for example the bobbin 110, may be spaced apart from the stationary unit, for example the housing 140, by means of the upper and lower elastic members 150 and 160.

At the initial position, the first position sensor 170 may not overlap the first magnet 190 or the second magnet 130 in the direction perpendicular to the first direction.

For example, the detecting portion 170s (Hall element) of the first position sensor 170 may be positioned so as to face the outer circumferential surface of the bobbin 110. For example, the detecting portion 170s of the first position sensor 170 may be disposed so as to detect the intensity of a magnetic field in which the line of magnetic force is directed from the inner circumferential surface toward the outer circumferential surface of the bobbin 110.

For example, at the initial position, the detecting portion 170s of the first position sensor 170 may be disposed on the outer circumferential surface of the bobbin 110 so as to be positioned in or aligned with the space between the second magnet 130 and the first magnet 190 in the first direction.

For example, at the initial position, the detecting portion 170s of the first position sensor 170 may not overlap the first magnet 190 or the second magnet 130 in the direction perpendicular to the first direction.

At the initial position, the intensity of the magnetic field of the first magnet 190 and the intensity of the magnetic field of the second magnet 130, which are detected by the first position sensor 170, may have positive values. At the initial position, the sum of the intensity of the magnetic field of the first magnet 190 and the intensity of the magnetic field of the second magnet 130, which are detected by the first position sensor 170, may be positive.

Figure 17A:
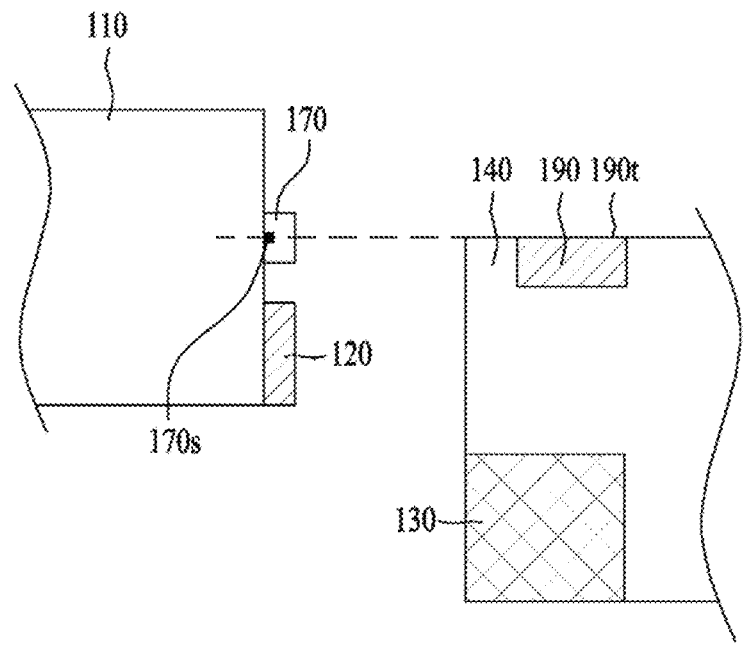
FIG. 17A is a view illustrating the relative positional relationships between the first position sensor, the first magnet and the second magnet at the first position of the movable unit.

FIG. 17A illustrates the relative positional relationship of the first position sensor 170, the first magnet 190 and the second magnet 130 when the movable unit is disposed at a first position. Here, the first position may be the highest position to which the movable unit is moved by the electromagnetic interaction between the first coil 120 and the first and second magnets 190 and 130.

Referring to FIG. 17A, at the first position, the detecting portion 170s of the first position sensor 170 may be aligned with the upper surface 190t of the first magnet 190 in the direction perpendicular to the first direction.

At the first position, the intensity of the magnetic field of each of the first magnet 190 and the second magnet 130 may have a positive value. At the first position, the sum of the intensity of the magnetic field of the first magnet 190 and the intensity of the magnetic field of the second magnet 130, which are detected by the first position sensor 170, may have a positive value.

For example, the sum of the intensity of the magnetic field of the first magnet 190 and the intensity of the magnetic field of the second magnet 130, which are detected by the first position sensor 170, while the movable unit moves upward from the initial position to the first position, may be included in the range of use of the VCM illustrated in FIG. 15, that is, the range of use in displacement of the bobbin 110.

Figure 17B:
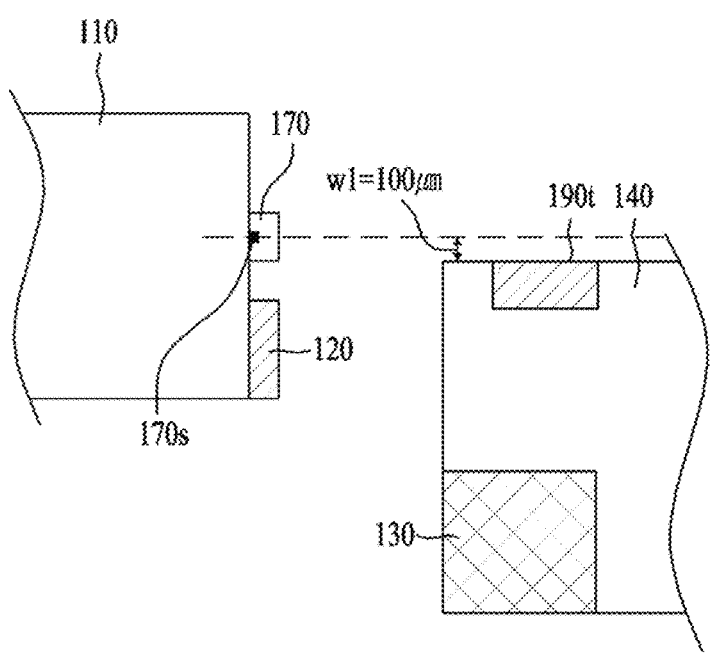
FIG. 17B is a view illustrating another embodiment of FIG. 17A.

FIG. 17B illustrates another embodiment of FIG. 17A.

Referring to FIG. 17B, the detecting portion 170s of the first position sensor 170 may be aligned with an imaginary line or plane, which is spaced apart from the upper surface 190t of the first magnet 190 by a first distance W1 in the direction perpendicular to the first direction. Here, the first distance W1 may be 100 µm or less.

In other words, even when the detecting portion 170s of the first position sensor 170 moves upward beyond the upper surface 190t of the first magnet 190 within the first distance W1, any of the intensity of the magnetic field of the first magnet 190, the intensity of the magnetic field of the second magnet 130, and the sum of both the intensities, which are detected by the first position sensor 170, may have a positive value.

Here, the first distance W1 may be the allowable range in which the detecting portion 170s of the first position sensor 170 can move upward beyond the upper surface 190t of the first magnet 190. When the detecting portion 170s exceeds the allowable range, at least one of the intensity of the magnetic field of the first magnet 190, the intensity of the magnetic field of the second magnet 130, and the sum of both the intensities of the magnetic fields of the first and second magnets 190 and 130, which are detected by the first position sensor 170, may have a negative value. This case may be out of the range of use of the VCM according to the embodiment of FIG. 15.

Figure 18A:
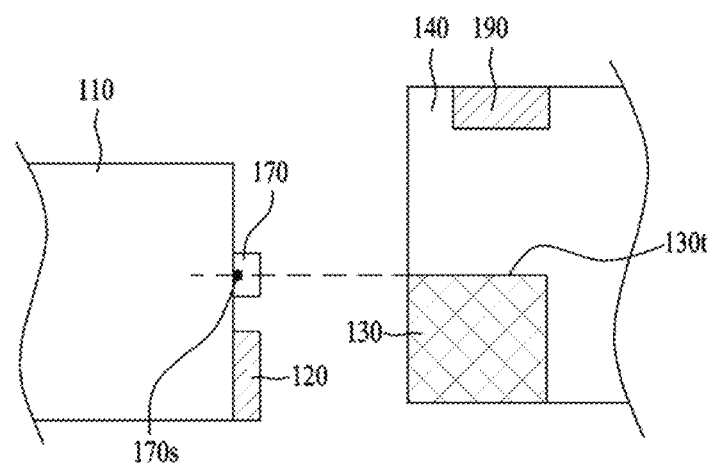
FIG. 18A is a view illustrating the relative positional relationships between the first position sensor, the first magnet and the second magnet at the second position of the movable unit.

FIG. 18A illustrates the relative positional relationships of the first position sensor 170, the first magnet 190 and the second magnet 130 when the movable unit is disposed at a second position. Here, the second position of the movable unit may be the lowest position to which the movable unit is moved by the electromagnetic interaction between the first coil 120 and the first and second magnets 190 and 130.

Referring to FIG. 18A, at the second position, the detecting portion 170s of the first position sensor 170 may be aligned with the upper surface 130t of the second magnet 130 in the direction perpendicular to the first direction.

At the second position, any of the intensity of the magnetic field of the first magnet 190, the intensity of the magnetic field of the second magnet 130, and the sum of both the intensities, which are detected by the first position sensor 170, may have a positive value.

Any of the intensity of the magnetic field of the first magnet 190, the intensity of the magnetic field of the second magnet 130, and the sum of the intensities of the magnetic fields of both the first and second magnets 190 and 130, which are detected by the first position sensor 170, while the detecting portion moves downward from the initial position to the second position, may have a positive value.

For example, the intensity of the magnetic field of the first magnet 190, the intensity of the magnetic field of the second magnet 130, and the sum of the intensities of the magnetic fields of the first and second magnets 190 and 130, which are detected by the first position sensor 170, while the movable unit moves downward from the initial position to the second position, may be included in the range of use of the VCM illustrated in FIG. 15.

Figure 18B:
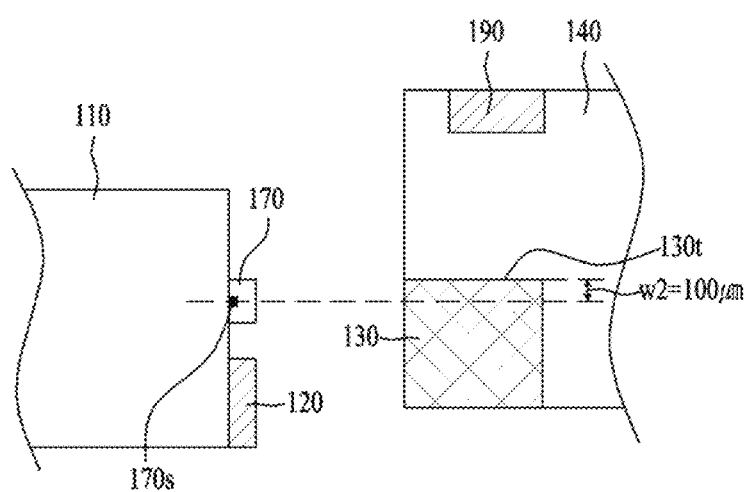
FIG. 18B is a view illustrating another embodiment of FIG. 18A.

FIG. 18B illustrates another embodiment of FIG. 18A.

Referring to FIG. 18B, the detecting portion 170s of the first position sensor 170 may be aligned with an imaginary line or plane, which is spaced apart from the upper surface 130t of the second magnet 130 by a second distance W2 in the direction perpendicular to the first direction. Here, the second distance W2 may be 100 μm or less.

In other words, even when the detecting portion 170s of the first position sensor 170 moves downward beyond the upper surface 130t of the second magnet 130 within the second distance W2, any of the intensity of the magnetic field of the first magnet 190, the intensity of the magnetic field of the second magnet 130, and the sum of the intensities of the magnetic fields of both the first and second magnets 190 and 130, which are detected by the first position sensor 170, may have a positive value.

Here, the second distance W2 may be the allowable range in which the detecting portion 170s of the first position sensor 170 can move downward beyond the upper surface 130t of the second magnet 130. When the detecting portion 170s exceeds the allowable range, at least one of the intensity of the magnetic field of the first magnet 190, the intensity of the magnetic field of the second magnet 130, and the sum of the intensities of the magnetic fields of both the first and second magnets 190 and 130, which are detected by the first position sensor 170, may have a negative value. This case may be out of the range of use of the VCM according to the embodiment of the FIG. 15.

Any of the intensity of the magnetic field of the first magnet 190, the intensity of the magnetic field of the second magnet 130, and the sum of the intensities of the magnetic fields of both the first and second magnets 190 and 130, which are detected by the first position sensor 170, while the bobbin 110 moves from the first position to the second position through the initial position, may have a positive value.

By virtue of the movement of the movable unit according to the embodiment, any of the intensity of the magnetic field of the first magnet 190, the intensity of the magnetic field of the second magnet 130, and the sum of the intensities of the magnetic fields of both the first and second magnets 190 and 130, which are detected by the first position sensor 170, may have a positive value. As a result, the embodiment is able to inhibit the effects of deviation in the intensity of a magnetic field of the second magnet 130 due to variation in temperature.

In addition, the embodiment is able to automatically compensate for variation in the focal length of the lens caused by variation in temperature by employing the range of use of the BCM illustrated in FIG. 15 as the range of intensity of the magnetic field, which is detected by the first position sensor 190 for the driving of auto-focusing.

Meanwhile, the lens moving apparatus according to the above-described embodiment may be used in various fields such as, for example, a camera module. The camera module may be applied to, for example, a mobile appliance such as a cellular phone or the like.

Figure 19:
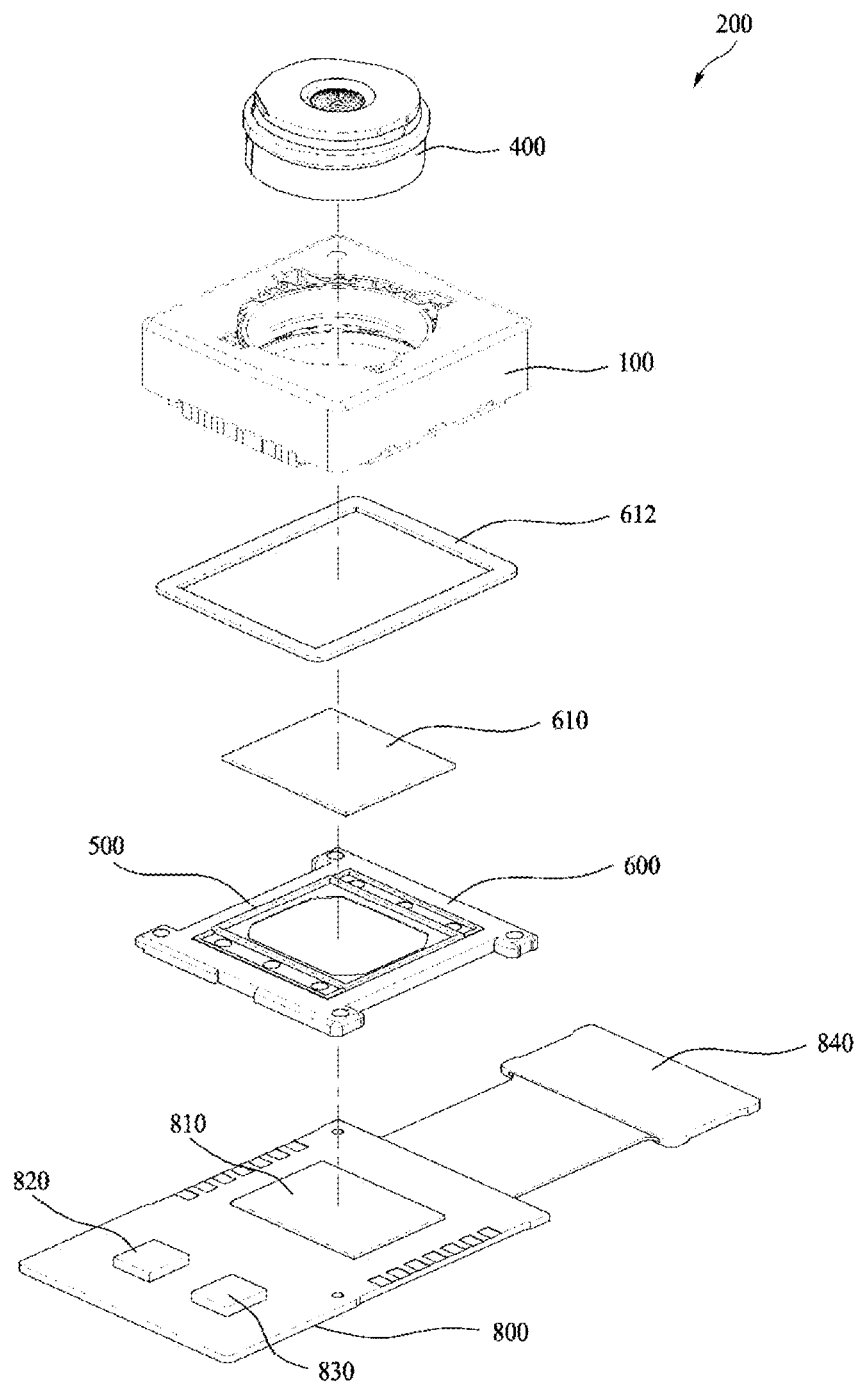
FIG. 19 is an exploded perspective view illustrating a camera module according to an embodiment.

FIG. 19 is an exploded perspective view illustrating a camera module 200 according to an embodiment.

Referring to FIG. 19, the camera module may include a lens barrel 400, the lens moving apparatus, an adhesive member 612, a filter 610, a first holder 600, a second holder 800, an image sensor 810, a motion sensor 820, a handshake controller 830, and a connector 840.

The lens barrel 400 may be mounted in the bobbin 110 of the lens moving apparatus.

The first holder 600 may be located under the base 210 of the lens moving apparatus. The filter 610 may be mounted on the first holder 600, and the first holder 600 may have a raised portion 500 on which the filter 610 is seated.

The adhesive member 612 may couple or attach the base 210 of the lens moving apparatus to the first holder 600. In addition to the attachment function described above, the adhesive member 612 may serve to inhibit contaminants from entering the lens moving apparatus.

The adhesive member 612 may be, for example, epoxy, thermohardening adhesive, or ultraviolet hardening adhesive.

The filter 610 may serve to inhibit light within a specific frequency band, having passed through the lens barrel 400, from being introduced into the image sensor 810. The filter 610 may be an infrared-light blocking filter, without being limited thereto. Here, the filter 610 may be oriented parallel to the X-Y plane.

The region of the first holder 600 in which the filter 610 is mounted may be provided with a bore in order to allow the light that passes through the filter 610 to be introduced into the image sensor 810.

The second holder 800 may be disposed under the first holder 600, and the image sensor 810 may be mounted on the second holder 800. The light that passes through the filter 610 is introduced into the image sensor 810 so as to form an image on the image sensor 810.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, a circuit pattern may be formed, and various devices may be coupled.

The image sensor 810 may receive an image contained in the light introduced through the lens moving apparatus, and may convert the received image into electrical signals.

The filter 610 and the image sensor 810 may be spaced apart from each other so as to be opposite to each other in the first direction.

The motion sensor 820 may be mounted on the second holder 800, and may be conductively connected to the handshake controller 830 through the circuit pattern formed on the second holder 800.

The motion sensor 820 outputs rotational angular speed information regarding the movement of the camera module 200. The motion sensor 820 may be embodied as a dual-axis or triple-axis gyro sensor or an angular speed sensor.

The handshake controller 830 may be mounted on the second holder 800, and may be conductively connected to the second position sensor 240 and the second coil 230 of the lens moving apparatus. For example, the second holder 800 may be conductively connected to the circuit board 250 of the lens moving apparatus, and the handshake controller 820 mounted on the second holder 800 may be conductively connected to the second position sensor 240 and the second coil 230 through the circuit board 250.

The handshake controller 830 may output a drive signal, which is required to allow the OIS movable unit of the lens moving apparatus to perform handshake compensation, based on feedback signals provided from the second position sensor 240 of the lens moving apparatus.

The connector 840 may be conductively connected to the second holder 800, and may have a port for the electrical connection of an external component.

Figure 20:
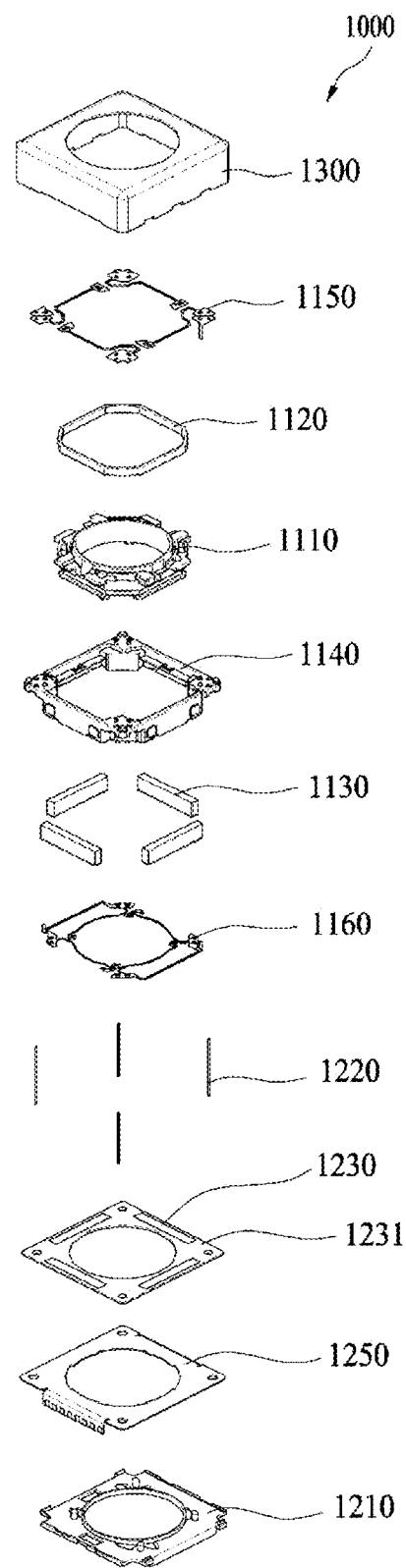
FIG. 20 is an assembled perspective view illustrating a lens moving apparatus according to another embodiment.

FIG. 20 is an assembled perspective view illustrating a lens moving apparatus 100 according to another embodiment.

The lens moving apparatus illustrated in FIG. 20 may include a movable unit. Here, the movable unit may perform auto-focusing and handshake compensation. The movable unit may include a bobbin 1110, a first coil 1120, a magnet 1130, a housing 1140, an upper elastic member 1150, and a lower elastic member 1160.

The bobbin 1110 may be provided on the outer circumferential surface thereof with the first coil 1120, which is located inside the first magnet 1130. The first coil 1120 may be installed in the inner space of the housing 140 so as to be reciprocally movable in the first direction via electromagnetic interaction between the first magnet 1130 and the first coil 1120. The first coil 1120 may be installed on the outer circumferential surface of the bobbin 1110 so as to electromagnetically interact with the first magnet 1130.

In addition, the bobbin 1110 may be elastically supported by the upper and lower elastic members 1150 and 1160, thereby performing auto-focusing by moving in the first direction.

The bobbin 1110 may include a lens barrel (not shown) in which at least one lens is installed. The lens barrel may be coupled within the bobbin 1110 in various manners.

For example, a female threaded portion may be formed in the inner circumferential surface of the bobbin 1110, and a male threaded portion corresponding to the female threaded portion may be formed on the outer circumferential surface of the lens barrel. Through screwing, the lens barrel may be coupled to the bobbin 1110. However, the disclosure is not limited thereto, and instead of forming the female threaded portion on the inner circumferential surface of the bobbin 1110, the lens barrel may be directly fixed inside the bobbin 1110 by other ways excluding screwing. Alternatively, at least one lens may be integrally formed with the bobbin 1110 without the lens barrel.

The lens coupled to the lens barrel may be configured as a single sheet, or two or more lenses may configure an optical system.

Auto-focusing may be controlled based on the direction of current, and may be implemented by moving the bobbin 1110 in the first direction. For example, the bobbin 1110 may move upward from the initial position thereof when forward current is applied, and the bobbin 1110 may move downward from the initial position thereof when reverse current is applied. Alternatively, the distance by which the bobbin 1110 moves in a predetermined direction may be increased or reduced by adjusting the quantity of current that flows in one direction.

The bobbin 1110 may be provided on the upper surface and the lower surface thereof with a plurality of upper support protrusions and lower support protrusions. The upper support protrusions may have a cylindrical or prismatic shape, and may serve to couple and secure the upper elastic member 1150. The lower support protrusions may have a cylindrical or prismatic shape, and may serve to couple and secure the lower elastic member 1160.

The upper elastic member 1150 may have through-holes corresponding to the upper support protrusions, and the lower elastic member 1160 may have through-holes corresponding to the lower support protrusions. The support protrusions and the through-holes may be securely coupled to each other via thermal fusion or an adhesive such as epoxy.

The housing 1140 may take the form of a hollow column to support the first magnet 1130, and may have an approximately square shape. The first magnet 1130 and the support member 1220 may be coupled respectively to the side surface portions of the housing 1140.

In addition, as described above, the bobbin 1110 may be provided within the housing 1140 so as to move in the first direction by being guided by the elastic members 1150 and 1160. In the embodiment, the first magnet 1130 may be located on the corner of the housing 1140, and the support member 1220 may be disposed on the side surface of the housing 1140.

The upper elastic member 1150 and the lower elastic member 1160 may elastically support the upward movement and/or downward movement of the bobbin 1110 in the first direction. The upper elastic member 1150 and the lower elastic member 1160 may be embodied as leaf-springs.

As illustrated in FIG. 20, the upper elastic member 1150 may include two upper elastic members that are separated from each other. By virtue of this bisected configuration, the respective divided parts of the upper elastic member 1150 may receive current of different polarities or different powers. In addition, in a modified embodiment, the lower elastic member 1160 may be divided into two parts, and the upper elastic member 1150 may have a unitary configuration.

Meanwhile, the upper elastic member 1150, the lower elastic member 1160, the bobbin 1110, and the housing 1140 may be assembled with one another via, for example, thermal fusion and/or using, for example, an adhesive. At this time, for example, after being fixed via thermal bonding, the adhesive may be used to complete the securing process.

The base 1210 may be disposed below the bobbin 1110, and may have an approximately square shape. A circuit board 1250 may be seated on the base 1210, and the lower end of the support member 1220 may be secured to the base 1210.

In addition, a support member seating hole may be formed in the upper surface of the base 1210 so that the lower portion of the support member 1220 is fitted into the support member seating hole. An adhesive may be applied to the support member seating recess 1214 so as to immovably secure the support member 1220.

The surface of the base 1210 that faces the portion of the circuit board 1250 equipped with a terminal rib 1253 may be provided with a support recess, which is sized to correspond to the terminal rib 1253. The support recess may be indented to a predetermined depth from the outer circumferential surface of the base 1210, so as to inhibit the portion equipped with the terminal rib 1253 from protruding outward, or so as to adjust the distance by which the portion equipped with the terminal rib 1253 protrudes.

The support member 1220 may be disposed on the side surface of the housing 1140, and may be coupled at the upper end thereof to the housing 1140 and at the lower end thereof to the base 1210. The support member 1220 may support the bobbin 1110 and the housing 1140 so that the bobbin 1110 and the housing 1140 are movable in the second and third directions, which are perpendicular to the first direction. In addition, the support member 1220 may be conductively connected to the first coil 1120.

The support member 1220 according to the embodiment is located on each outer side surface of the square housing 1140, and therefore a total of four support members may be symmetrically installed. However, the disclosure is not limited thereto, and two support members may be provided on each straight surface, so that a total of eight support members are provided.

In addition, the support member 1220 may be conductively connected to the upper elastic member 1150, or may be conductively connected to the straight surface of the upper elastic member 1150.

In addition, since the support member 1220 is formed separately from the upper elastic member 1150, the support member 1220 and the upper elastic member 1150 may be conductively connected to each other using, for example, a conductive adhesive or solders. Accordingly, the upper elastic member 1150 may apply current to the first coil 1120 through the support member 1220, which is conductively connected thereto.

Although the support member 1220 is illustrated in FIG. 20 as being a wire, the disclosure is not limited thereto, and the support member 1220 may take a plate shape.

The second coil 1230 may perform handshake compensation by moving the housing 1140 in the second direction and/or the third direction via electromagnetic interaction with the first magnet 1130.

Here, the second direction and the third direction may include not only the x-axis and y-axis directions, but also directions that are substantially close to the x-axis and y-axis directions. In the embodiment, although the housing 1140 may move parallel to the x-axis and the y-axis in terms of driving, the housing 1140 may also move slightly obliquely relative to the x-axis or the y-axis when moved while being supported by the support member 1220.

In addition, it is necessary to install the first magnet 1130 at a position corresponding to the second coil 1230.

The second coil 1230 may be disposed so as to be opposite the first magnet 1130 secured to the housing 1140.

In one embodiment, the second coil 1230 may be disposed outside the first magnet 1130. Alternatively, the second coil 1230 may be spaced apart and downward from the first magnet 1130 by a predetermined distance.

According to the embodiment, a total of four second coils 1230 may be installed on four corners of a circuit member 1231, without being limited thereto. Alternatively, only two second coils, including one second-direction second coil and one third-direction second coil, may be installed, and four or more second coils may be installed.

In the embodiment, a circuit pattern may be formed in the second coil 1230 on the circuit member 1231 and an additional second coil may be disposed above the circuit member 1231, without being limited thereto. Alternatively, only the second coil 1230 may be disposed above the circuit member 1231, obviating the circuit pattern having the form of the second coil 1230 on the circuit member 1231.

Alternatively, the second coil 1230 may be formed by winding a wire in a donut shape, or may be configured as an FP coil, so as to be conductively connected to the circuit board 1250.

The second coil 1230 may be disposed above the base 1210 and below the housing 1140. At this time, the circuit member 1231 including the second coil 1230 may be installed on the upper surface of the printed circuit board 1250, which is disposed above the base 1210.

However, the disclosure is not limited thereto, and the second coil 1230 may come into close contact with the base 1210, or may be spaced apart from the base 1210 by a predetermined distance. The second coil 1230 may be formed on a separate board, and the board in turn may be stacked on and connected to the printed circuit board 1250.

The printed circuit board 1250 may be coupled to the upper surface of the base 1210, and may have a through-hole or recess at a position corresponding to the support member seating hole so as to expose the support member seating hole.

The circuit board 1250 may have the bent terminal rib 1253 on which a plurality of terminals 1251 is formed. The printed circuit board 1250 according to the embodiment may be provided with two bent terminal ribs 1253. The terminals 1251 may be arranged on the terminal rib 1253 so as to receive external power and to supply current to the first coil 1120 and the second coil 1230. The number of terminals formed on the terminal rib 1253 may be increased or reduced according to the kind of control elements that are required. In addition, the printed circuit board 1250 may have one terminal rib 1253, or may have three or more terminal ribs.

The printed circuit board 1250 may be provided thereon with various elements, circuit patterns or the like, which are conductively connected to the terminals. In addition, the printed circuit board 1250 may be provided thereon with a plurality of layers for forming elements, circuit patterns or the like, which may be conductively connected to each other.

Elements or circuit patterns may be independently provided on the respective layers, or elements or circuit patterns, which perform specific functions, may be formed by stacking the respective layers.

The terminal rib 1253 is also a portion of the printed circuit board 1250. Accordingly, the terminal rib 1253 may be stacked on a plurality of layers, or may be formed on a single layer.

A cover member 1300 may have an approximately box shape, may accommodate, for example, the movable unit, the second coil 1230, and a portion of the printed circuit board 1250, and may be coupled to the base 1210. The cover member 1300 may inhibit damage to, for example, the movable unit, the second coil 1230, and the printed circuit board 1250 accommodated therein. In particular, the cover member 1300 may inhibit the outward leakage of an electromagnetic field, which is generated by, for example, the first magnet 1130, the first coil 1120, and the second coil 1230 accommodated therein, thereby enabling collimation of the electromagnetic field.

Figure 21:
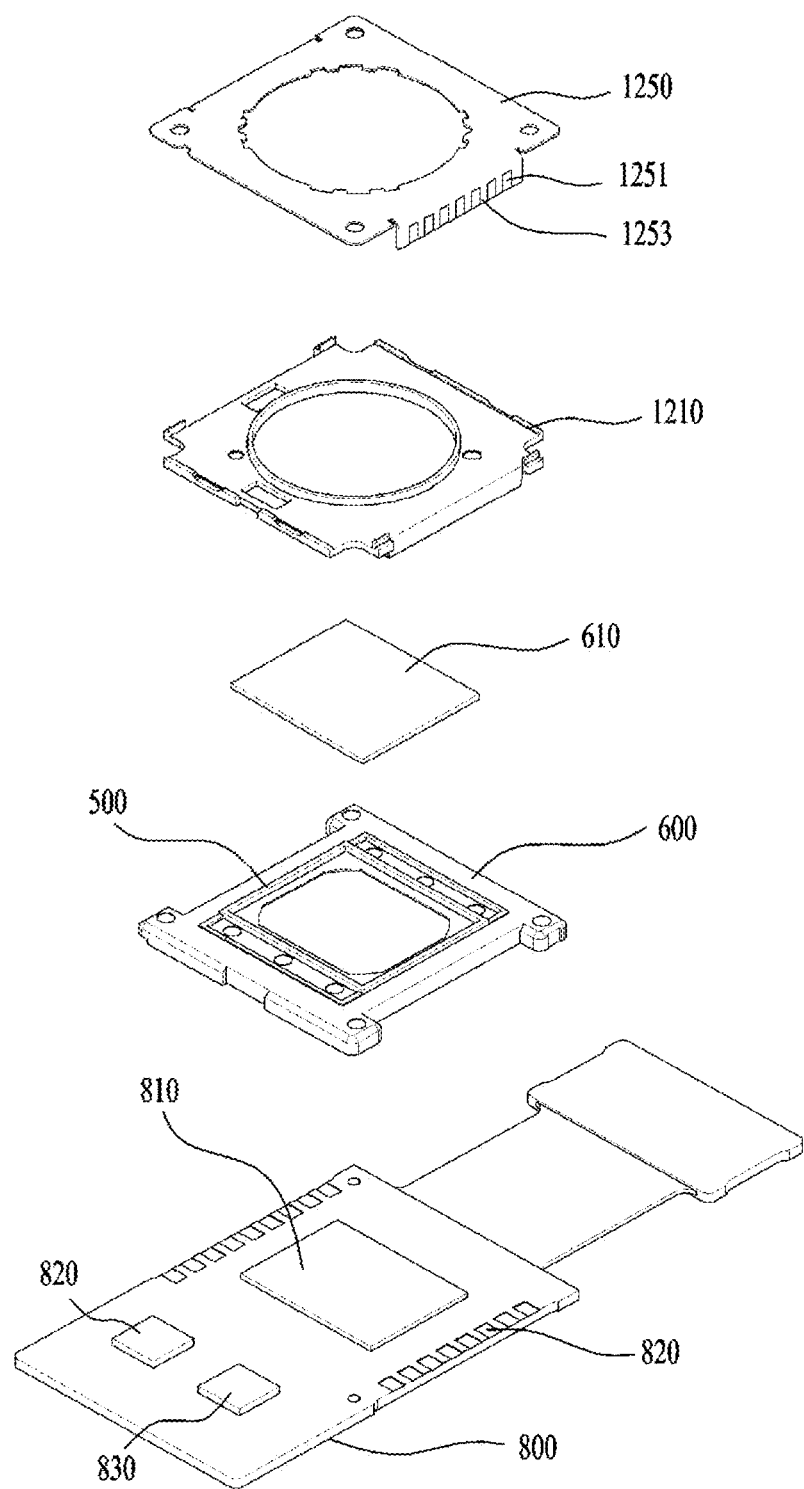
FIG. 21 is an exploded perspective view illustrating a camera module including the lens moving apparatus shown in FIG. 20.

FIG. 21 illustrates a camera module including the lens moving apparatus 1000 shown in FIG. 20. FIG. 21 illustrates only the printed circuit board 1250 and the base 1210. In the drawing, the same reference numbers as those used in FIGS. 19 and 20 indicate the same parts, and descriptions of the same parts are set forth in a perfunctory manner, or are omitted.

Referring to FIG. 21, the camera module according to the embodiment may include the lens moving apparatus 1000, a first holder 600, an image sensor 810, a filter 610 and a board 800. The first holder 600 may be disposed below the base 1210, and may be provided with the filter 610 mounted thereon.

The filter 610 may serve to inhibit light having a specific frequency band having passed through the lens barrel, from being introduced into the image sensor 810. The filter 610 is preferably placed on the x-y plane.

The filter 610 may be coupled to the upper surface of the first holder 600, and may be an infrared-light blocking filter. The area of the first holder 600 on which the filter 610 is mounted may be formed with a bore so as to allow the light that passes through the filter 610 to be introduced into the image sensor 810.

The base 1210 and the first holder 600 may be coupled to each other via an adhesive. The adhesive used herein may include epoxy, thermohardening adhesive, ultraviolet hardening adhesive and the like.

The board 800 may be disposed below the first holder 600, and may be provided with the image sensor 810 mounted thereon. The image sensor 810 is a component into which the light that passes through the filter 610 is introduced and on which an image included in the light is formed.

The image sensor 810 is preferably placed on the x-y plane. In an embodiment, the image sensor 810 may be mounted on the first holder 600.

The board 800 may include various elements, devices, controllers and the like for converting an image formed on the image sensor 810 into an electrical signal and transmitting the signals to an external component.

The board 800 may be coupled to the first holder 600. Here, the board 800 may be coupled and secured to the first holder 600 using an adhesive, as in the case of the first holder 600. The board 800 may be embodied as a circuit board, on which the image sensor 810 is mounted, a circuit pattern is formed, and various elements are coupled.

The board 800 may be conductively connected to the printed circuit board 1250. As a result, the printed circuit board 1250 may receive current, which is required for driving the lens moving apparatus 1000, from the board 800, and the printed circuit board 1250 and the board 800 may exchange electric signals with each other.

For example, when the lens moving apparatus 1000 is assembled, the terminals 1251 formed on the printed circuit board 1250 and the soldered portions 820 formed on the board 800 may be disposed at positions corresponding to each other.

Accordingly, the terminals 1251 of the printed circuit board 1250 and the soldered portions 820 of the board 800 may be respectively coupled to each other through soldering or the like, so that the printed circuit board 1250 may be conductively connected to the board 800.

Figure 22:
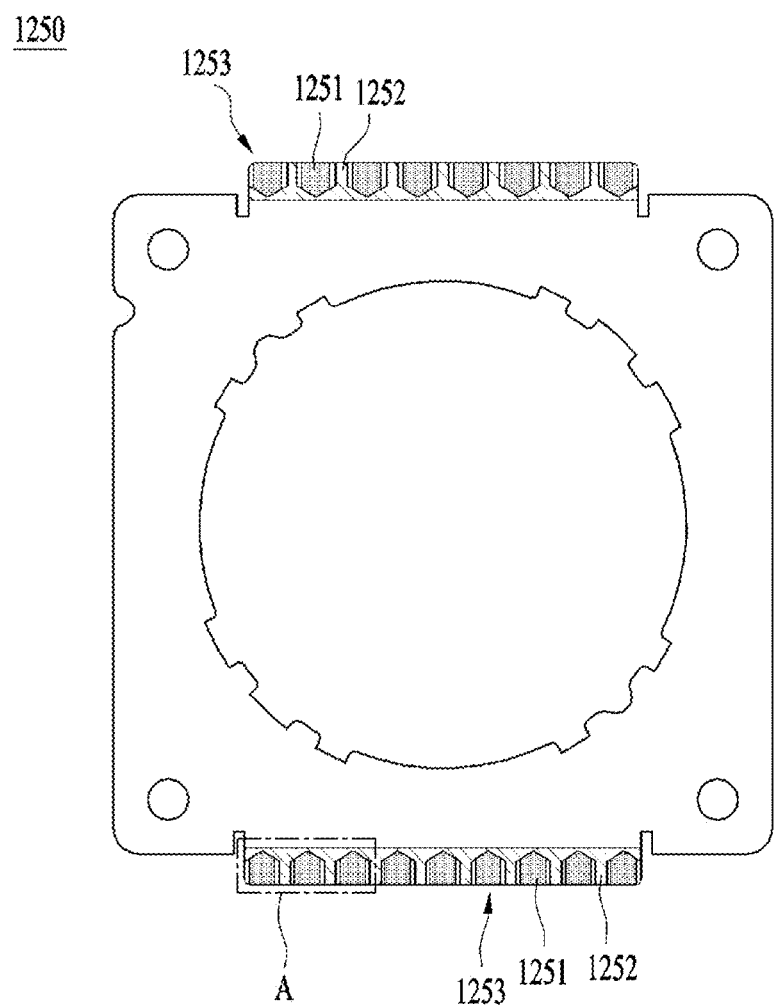
FIG. 22 is a plan view illustrating a printed circuit board according to an embodiment.
Figure 23:
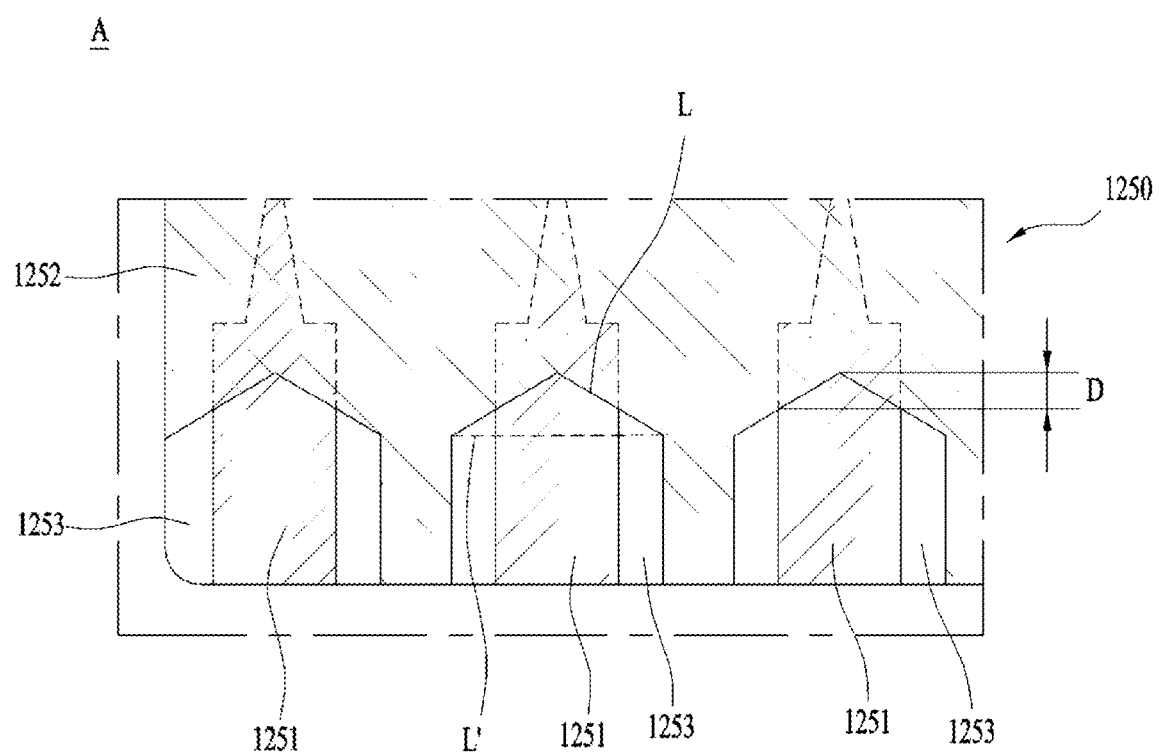
FIG. 23 is an enlarged view illustrating portion A in FIG. 22.

FIG. 22 is a plan view illustrating the printed circuit board 1250 according to an embodiment. FIG. 23 is an enlarged view illustrating portion A in FIG. 22. The printed circuit board 1250 may include a terminal rib 1253, the terminals 1251 and a coating layer 1252.

The terminal rib 1253 may be formed at the lateral side of the printed circuit board 1250 so as to be bendable and to be conductively connected to an external component. The external component may be, for example, the board 800 of the lens moving apparatus 1000.

As described above, the terminals 1251 formed on the terminal rib 1253 and the soldered portions 820 formed on the board 800 may be coupled to each other through soldering or the like so as to be conductively connected to each other. Consequently, the printed circuit board 1250 of the lens moving apparatus 1000 and the board 800 of the camera module may be conductively connected to each other.

As illustrated in FIG. 22, the terminal rib 1253 may be embodied as at least one terminal rib, which protrudes from the printed circuit board 1250 in a lateral direction, and may be made of a soft material. To this end, the printed circuit board 1250, which is integrally formed with the terminal rib 1253, may be entirely made of a soft material.

Accordingly, the terminal rib 1253 may be formed at the lateral side of the printed circuit board 1250 in the direction parallel to the printed circuit board 1250. When the lens moving apparatus is assembled, the terminal rib 1253, made of a soft material, may be bent downward at an angle of about 90°, and may be coupled to a lateral side of the base 1210 through bonding or the like.

The terminals 1251 may include a plurality of terminals formed on the surface of the terminal rib 1253. Specifically, the plurality of terminals 1251 may be formed on the surface of the terminal rib 1253 at predetermined intervals through a printing process, an etching process or the like.

The number of terminals 1251 may be appropriately selected depending on the structures of the printed circuit board 1250, the lens moving apparatus 1000, the board 800 and the like, as well as the electric structures therebetween. When two terminal ribs 1253 are provided, there is no necessity for the numbers of terminals 1251 formed on the terminal ribs 1253 to coincide with each other.

The coating layer 1252 may be formed on the surfaces of the terminal rib 1253 and the terminals 1251 so as to partially cover the surfaces of the terminal rib 1253 and the terminals 1251. The coating layer 1252 may be formed on the surfaces, that is, the upper surface of the terminal rib 1253 and the terminals 1251, so as to serve to conductively isolate the terminal rib 1253 and the terminals 1251 from each other, or to protect them from wear. Here, the coating layer 1252 may be a photo solder resist (PSR) or a coverlay.

Furthermore, the coating layer 1252 may inhibit lead from adhering to an undesired area in a soldering process, and may inhibit various elements, circuit patterns or the like, which are formed on the printed circuit board 1250, from being directly exposed to the air and thus being deteriorated by oxygen or moisture.

The coating layer 1252 may be formed so as to cover the terminals 1251 while the surfaces of the terminals 1251 are partially exposed. Since the terminals 1251 are intended to be conductively connected to the terminals 1251 of the board 800 or the like, soldered portions for conductive connection are preferably provided. Accordingly, the coating layer 1252 may be formed on the upper surfaces of the terminals 1251 while exposed regions of the terminals 1251 are left.

The coating layer 1252 may be made of, for example, photo solder resist ink or polyimide.

The coating layer 1252 may be formed in such a way as to coat the terminal rib 1253 and the terminals 1251 with photo solder resist ink and to harden the photo solder resist ink. At this time, the exposed regions of the terminals 1251 may be formed by coating the entire terminals 1251 with photo solder resist ink and removing an unnecessary portion of the photo solder resist ink through light exposure and developing processes. Alternatively, the exposed regions of the terminals 1251 may be formed by applying photo solder resist ink only to a necessary area and hardening the photo solder resist ink.

Polyimide may be prepared in the form of film or tape. The film or tape may be cut into a desired shape, and may be applied to the surfaces of the terminal rib 1253 and the terminals 1251, thereby forming the coating layer 1252 while the exposed regions are left on the terminals 1251.

Alternatively, both photo solder resist ink and polyimide may be used. Depending on an application process and the structure of a product, polyimide may be applied after the application of photo solder resist ink, or photo solder resist ink may be applied after the application of polyimide.

Polyimide, which is a soft material, may also be used in the production of a flexible printed circuit board (FPCB). Accordingly, in an embodiment, the printed circuit board 1250 and the coating layer 1252 may be made of the same material, that is, polyimide.

Referring to FIG. 23, the region of the terminal 1251 that is indicated by the hidden line is a region, on the upper surface of which the coating layer 1252 is formed and which is conductively connected to various elements and a circuit pattern provided on the printed circuit board 1250.

Figure 24:
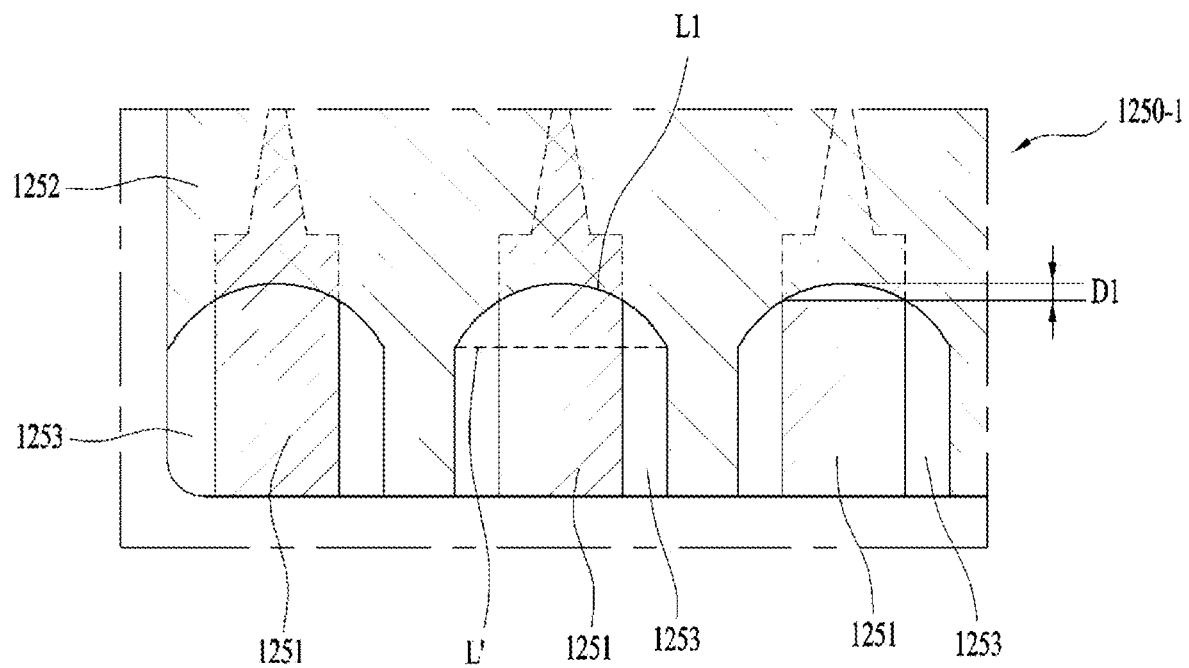
FIG. 24 is an enlarged view illustrating a printed circuit board according to another embodiment.

In FIG. 23, the region of the terminal 1251 that is indicated by a solid line is a region, on the upper surface of which the coating layer 1252 is not formed so as to be conductively connected to the board 800 or the like. FIG. 24 also illustrates the terminals 1251 in the same manner as described above.

As illustrated in FIG. 23, a boundary line may be provided between the coating layer 1252 and the terminal 1251. In an embodiment, the length of the boundary line may be set to be longer than the width of the terminal 1251.

If the width of the terminal 1251 is the same as the length of the boundary line L', cracks are likely to form at the boundary line L'. In other words, when the camera module including the printed circuit board 1250 is subjected to an impact by falling or the like, stress may be concentrated at the boundary line L1, and the stress may cause cracks at the boundary line L'.

In FIGS. 23 and 24, the region of the terminal 1251 that is indicated by the hidden line above the boundary line L' may be firmly coupled or secured to the terminal rib 1253 by means of the coating layer 1252.

However, the region of the terminal 1251 that is indicated by the solid line, that is, the exposed region on which the coating layer 1252 is formed, may be less firmly coupled or secured to the terminal rib 1253 compared to the region of the terminal 1251 that is indicated by the hidden line. Since the exposed region may be connected to a component such as the board 800 through soldering, impulsive force, which is applied to a component such as the board 800 when subjected to an external impact, may be directly transmitted to the exposed region.

Accordingly, when the camera module is subjected to an external impact as the result of falling or the like, the exposed region of the terminal 1251 may be subjected to a greater impact than the unexposed region that is indicated by the hidden line, and stress may be concentrated on the boundary line L' due to the difference in the magnitudes of impact.

Stress concentrated on the boundary line L' may cause cracks at the terminal 1251. In addition, when stress is accumulated due to the repeated application of external stress, cracks may develop, thereby causing the terminal 1251 to break along the boundary line L'. The breakage of the terminal 1251 caused by cracks may cause malfunction of the camera module.

In order to inhibit the generation of cracks at the terminal 1251, the length of the boundary line L, defined between the coating layer 1252 formed on the surface of the terminal 1251 and the terminal 1251, may be longer than the width of the terminal 1251.

As illustrated in FIG. 23, the boundary line L may be a line having a bent point, that is, it may be the two equilateral sides of an isosceles triangle. Alternatively, the boundary line L may be the two adjacent sides of a general triangle.

In this configuration, the boundary line L may be longer than the width of the terminal 1251. Accordingly, stress, which is generated at the terminal 1251 due to the application of an external impact, may be more extensively dispersed in the extended boundary line L than in the linear boundary line L'.

Since stress is dispersed by virtue of the boundary line L having this configuration, it is possible to inhibit the concentration of stress on a specific point on the boundary line L, that is, to inhibit the generation of cracks even when the exposed region of the terminal 1251 is subjected to an impact in the longitudinal or lateral direction of the terminal 1251 due to the application of an external impact.

FIG. 24 illustrates a printed circuit board 1250-1 according to another embodiment. As illustrated in FIG. 24, the boundary line L1 may be configured to have a round shape, an arcuate shape or a semicircular shape.

In this case, the boundary line L1 may be longer than the width of the terminal 1251, similar to the case shown in FIG. 23. Accordingly, stress, which is generated at the terminal 1251 due to the application of an external impact, may be more extensively dispersed in the extended boundary line L than in the linear boundary line L'.

Accordingly, by virtue of the dispersion of stress, it is possible to suppress the concentration of stress on a specific point on the boundary line L1, that is, the inhibit the generation of cracks due to the application of an external impact, similar to the case shown in FIG. 23.

In addition, in the case in which the boundary line L1 is configured to have a round shape, since a notch or a sharp edge is not formed on the boundary line L1, it is possible to inhibit the generation of cracks due to the concentration of stress on the notch or the sharp edge.

Although not illustrated in the drawings, the boundary line L1 may be configured to have any shape, such as a corrugated shape, a shape having repeated bent points or a shape having repeated curves as long as the length of the boundary line L1 is increased.

In FIGS. 23 and 24, the width D or D1 of the boundary line L or L1, which is measured in the longitudinal direction of the terminal 1251, may be appropriately adjusted such that stress is not concentrated on a specific point on the boundary line L or L1.

For example, the width of the boundary line L or L1 may be within a range of 0.02 mm to 0.08 mm, and preferably a range of 0.03 mm to 0.07 mm.

If the width D or D1 of the boundary line L or L1 is less than 0.02 mm, it is not possible to obtain an effect of substantially suppressing the generation of cracks compared to the linear boundary line L'. If the width D or D1 of the boundary line L or L1 greater than 0.08 mm, portions similar to notches or sharp edges are formed, and thus stress is concentrated on the portions, thereby causing cracks.

Figure 25:
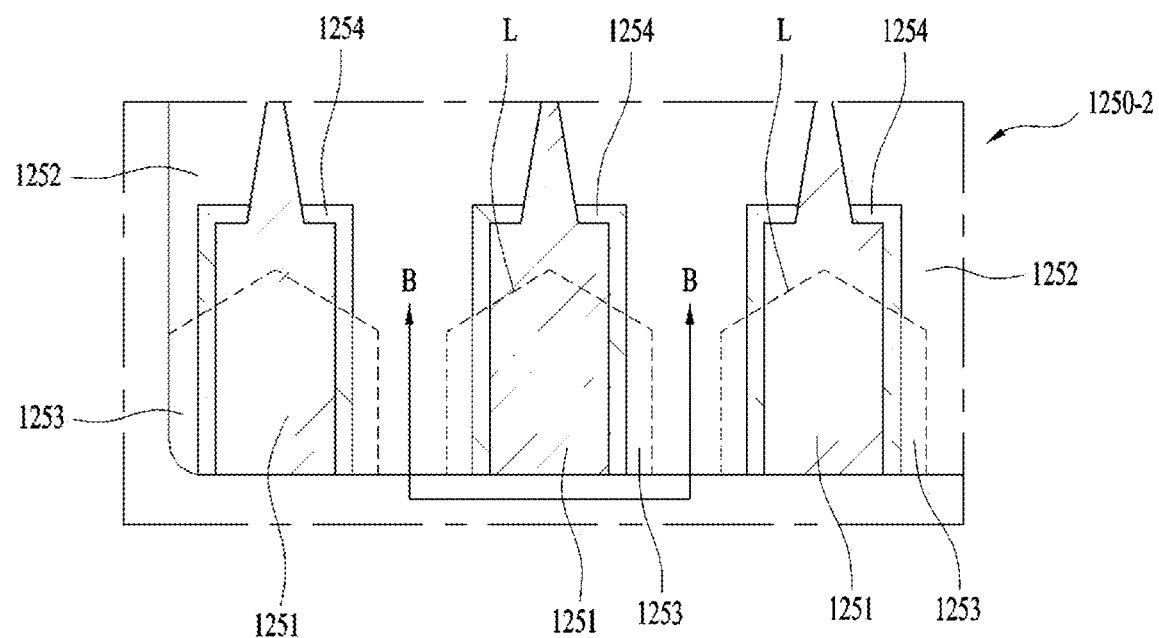
FIG. 25 is an enlarged view illustrating a printed circuit board according to a further embodiment.
Figure 26:
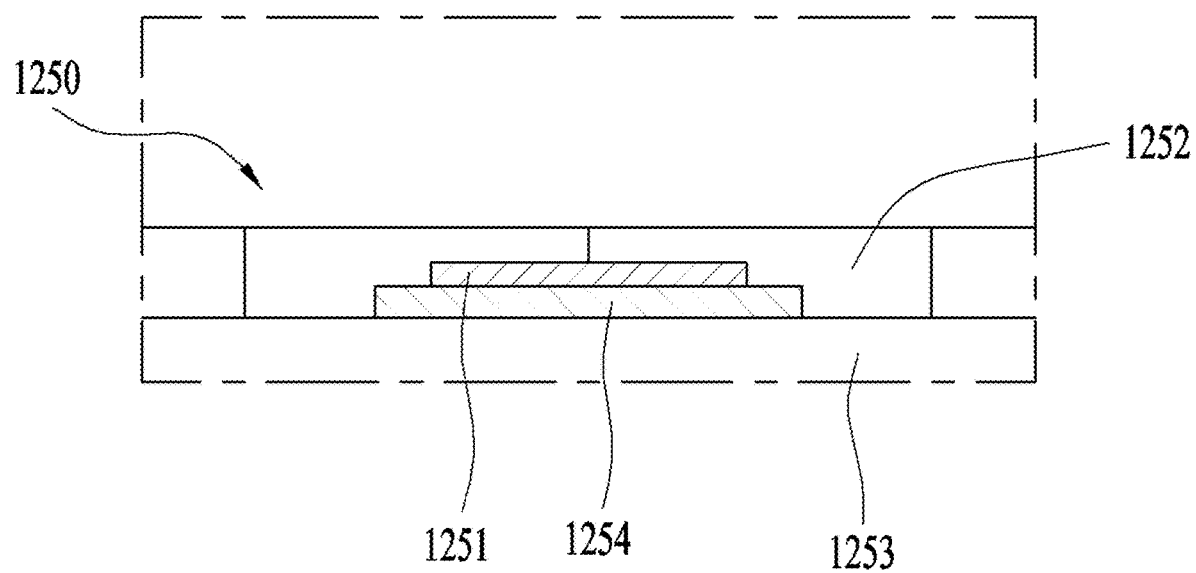
FIG. 26 is a side view of the printed circuit board shown in FIG. 25 when viewed in the direction of B.

FIG. 25 illustrates a printed circuit board 1250-2 according to a further embodiment. FIG. 26 is a side view of the printed circuit board shown in FIG. 25 when viewed in the direction of B. In FIG. 25, the coating layer 1252, which is formed at the uppermost layer of the printed circuit board 1250-2, is indicated by a hidden line. The drawing is conveniently drawn so as to clearly illustrate the structures of a terminal 1251 and a conductive layer 1254, which are formed under the hidden line. This is equally applied to FIG. 27, which will be described later.

As illustrated in FIGS. 25 and 26, the printed circuit board 1250-2 may include the conductive layer 1254, which is formed on the lower surface of the terminal 1251 so as to be conductively connected to the terminal 1251.

The conductive layer 1254 may be formed into a plate shape from copper or a copper alloy, and may include the same number of conductive layers as the number of terminals 1251. One terminal 1251 and one conductive layer 1254, which correspond to each other, may be isolated from another terminal 1251 and another conductive layer 1254, and may be conductively connected to each other.

Although FIG. 25 exemplarily illustrates the case in which the boundary line L has a bent point, the conductive layer 1254 may be provided even if the boundary line L has any of a round shape, an arcuate shape and a corrugated shape.

The conductive layer 1254 may be conductively connected to the terminal 1251. To this end, the conductive layer 1254 and the terminal 1251 may be conductively connected to each other through, for example, a printing process. Alternatively, the conductive layer 1254 and the terminal 1251 may be attached to each other via a conductive adhesive.

The layered structure of the terminal 1253 of the printed circuit board 1250-2 may be configured as illustrated in FIG. 26. In this layered structure, the terminal rib 1253, the conductive layer 1254, the terminal 1251 and the coating layer 1252 may be formed in that order based on the center of the terminal 1251.

Specifically, the terminal rib 1253 may be disposed at the lowermost layer, and the conductive layer 1254 may be disposed on the upper surface of the terminal rib 1253. The terminal 1251 may be disposed on the upper surface of the conductive layer 1254. A portion of the coating layer 1252 may be disposed on the upper surface of the terminal rib 1253 such that the upper surface of the terminal rib 1253 is partially exposed.

The exposed area of the upper surface of the terminal rib 1253 may be conductively connected to a component such as the board 800. Here, the terminal rib 1253, the conductive layer 1254 and the terminal 1251 may be conductively connected to each other, so that various elements and a circuit pattern formed on the printed circuit board 1250-2 or the terminal rib 1253 and the terminal 1251 may be conductively connected to each other.

Even if cracks form at the boundary plane between the terminal 1251 and the coating layer 1252, thereby causing breakage of the terminal 1251, it is still possible to maintain the conductive connection between the terminal 1251 and the terminal rib 1253 by means of the conductive layer 1254. Accordingly, the conductive layer 1254 is able to inhibit breakage of the terminal 1251 at the boundary line L of the terminal 1251.

Figure 27:
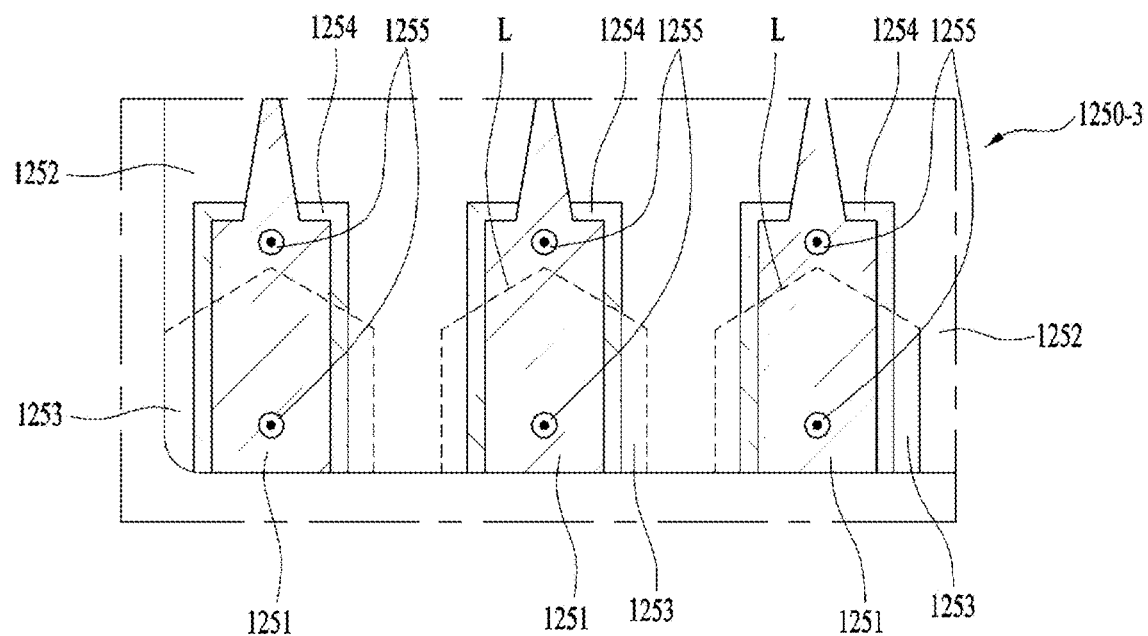
FIG. 27 is an enlarged view illustrating a printed circuit board according to still a further embodiment.

FIG. 27 illustrates a printed circuit board 1250-3 according to still a further embodiment. As illustrated in FIG. 27, the printed circuit board 1250-3 may further include at least one via 1255. The via 1255 may be formed through the conductive layer 1254 and the terminal 1251 so as to conductively connect the conductive layer 1254 to the terminal 1251.

The via 1255 may be formed by plating a conductive metal such as copper or nickel, and the plated metal may conductively connect the terminal 1251 to the conductive layer 1254, disposed on the upper surface of the terminal 1251.

The via 1255 may be formed in each of the terminals 1251 and each of the conductive layers 1254, and one terminal 1251 and one conductive layer 1254, which correspond to each other, may be appropriately provided with one or more vias 1255 in consideration of the overall size and structure of the printed circuit board 1250-3, the size of the via 1255 and the like.

The layered structure of the printed circuit board 1250-3 may be configured such that the terminal rib 1253, the conductive layer 1254, the terminal 1251 and the coating layer 1252 are layered in this order, based on the center of the terminal 1251 and the via 1255 may be formed therein.

Specifically, the terminal rib 1253 may be disposed at the lowermost layer, and the conductive layer 1254 may be disposed on the upper surface of the terminal rib 1253. The terminal 1251 may be disposed on the upper surface of the conductive layer 1254. A portion of the coating layer 1252 may be disposed on the upper surface of the terminal rib 1253 such that the upper surface of the terminal rib 1253 is partially exposed.

The via 1255 may penetrate through the conductive layer 1254 and the terminal 1251, and the via 1255 may conductively connect the terminal rib 1253, the conductive layer 1254 and the terminal 1251 to each other.

By virtue of the via 1255, the terminal rib 1253, the conductive layer 1254 and the terminal 1251 may be conductively connected to each other, and various elements and the circuit pattern, which are provided on the printed circuit board 1250 or the terminal rib 1253, may be conductively connected to the terminal 1251.

Even if cracks form in the boundary plane between the terminal 1251 and the coating layer 1252, thereby causing breakage of the terminal 1251, it is still possible to maintain the conductive connection between the terminal 1251 and the terminal rib 1253 and the conductive layer 1254 by means of the via 1255. Accordingly, the via 1255 is able to inhibit breakage of the terminal 1251 at the boundary line L of the terminal 1251.

The embodiment is constructed such that the length of the boundary line L between the coating layer 1252 and the terminal 1251 is increased so as to widely disperse stress generated at the boundary line L, thereby suppressing the generation of cracks due to the concentration of stress.

In addition, since the printed circuit board 1250-3 includes the conductive layer 1254, there is an effect of maintaining the conductive connection between the printed circuit board 1250 and the terminal 1251 even if the terminal 1251 is broken due to stress generated at the boundary line L.

Furthermore, since the printed circuit board 1250-3 includes the via 1255, there is an effect of maintaining the conductive connection between the printed circuit board 1250-3 and the terminal 1251 even if the terminal 1251 is broken due to stress generated at the boundary line L.

The printed circuit boards 1250 and 1250-1 to 1250-3 according to the above embodiments may be equally applied to the circuit board 250 of the lens moving apparatus illustrated in FIG. 2.

Figure 28:
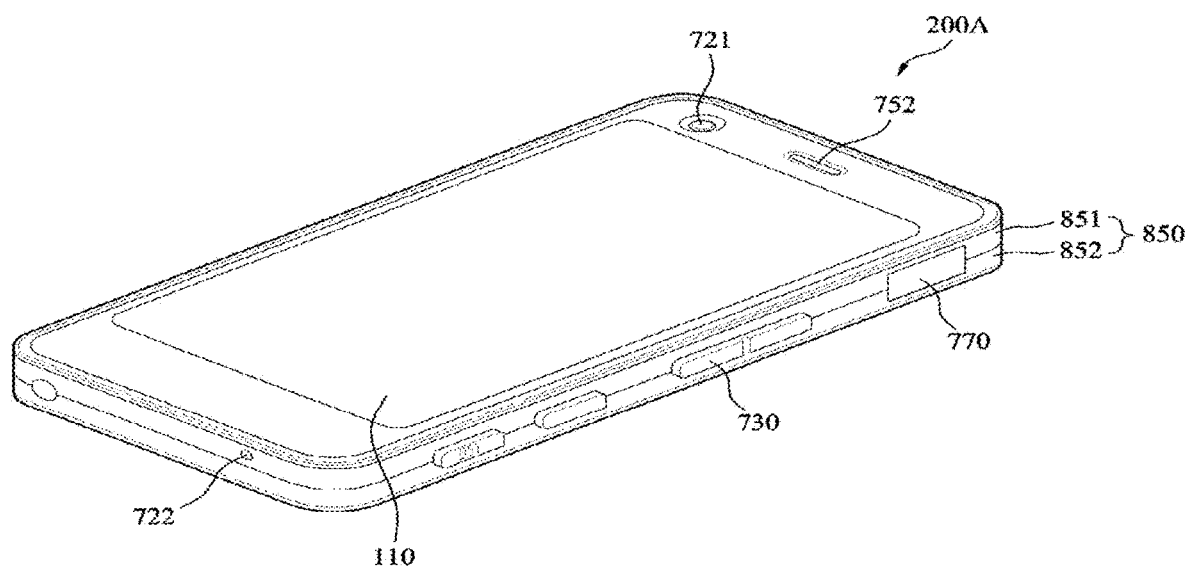
FIG. 28 is a perspective view illustrating a portable terminal including a camera module according to an embodiment.
Figure 29:
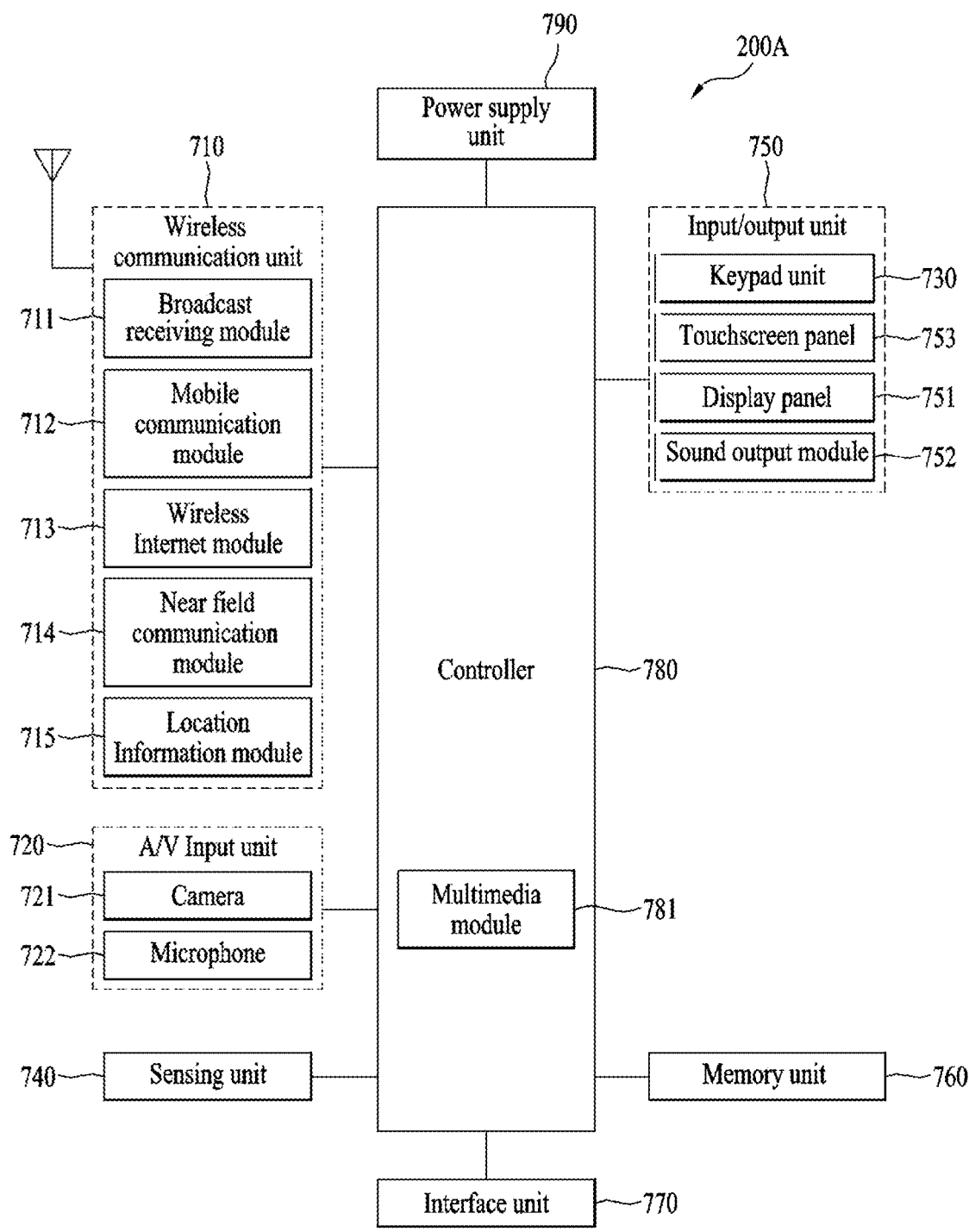
FIG. 29 is a view illustrating the configuration of the portable terminal illustrated in FIG. 28.

FIG. 28 is a perspective view illustrating a portable terminal 200A including a camera module according to an embodiment. FIG. 29 is a view illustrating the configuration of the portable terminal 200A illustrated in FIG. 28.

Referring to FIGS. 28 and 29, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 28 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a near field communication module 714, and a location information module 715.

The A/V input unit 720 serves to input audio signals or video signals, and may include, for example, a camera 721 and a microphone 722.

The camera 721 may be the camera module 200 according to the embodiment illustrated in FIG. 19 or the camera module illustrated in FIG. 21.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. For example, when the terminal 200A is a slide-type phone, the sensing unit 740 may detect whether the slide-type phone is open or closed. In addition, the sensing unit 740 serves to sense, for example, whether power is supplied from the power supply unit 790, or whether the interface unit 770 is coupled to an external component.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. For example, the display module 751 may include at least one of a liquid crystal display, a thin film transistor liquid crystal display, an organic light emitting diode display, a flexible display and a 3D display.

The sound output module 752 may output audio data received from the wireless communication unit 710 in, for example, a call signal receiving mode, a call mode, a recording mode, a voice recognition mode, or a broadcast receiving mode, or may output audio data stored in the memory unit 760.

The touchscreen panel 753 may convert variation in capacitance, caused by a user's touch on a specific region of a touchscreen, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external component. The interface unit 770 may receive power or data from the external component, and may transmit the same to respective constituent elements inside the terminal 200A, or may transmit data inside the terminal 200A to the external component. For example, the interface unit 770 may include, for example, a wired/wireless headset port, an external charger port, a wired/wireless data port, a memory card port, a port for the connection of a device having an identification module, an audio input/output (I/O) port, a video I/O port, and an earphone port.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be provided inside the controller 780, or may be provided separately from the controller 780.

The controller 780 may perform pattern recognition processing, by which writing or drawing, input to a touchscreen is perceived as characters and images respectively.

The power supply unit 790 may supply power required to operate the respective constituent elements upon receiving external power or internal power under the control of the controller 780.

As is apparent from the above description, the embodiments are able to improve the reliability of operation of auto-focusing by inhibiting effects of deviation in the intensity of a magnetic field of the magnet owing to variation in temperature, and are able to automatically compensate for variation in the focal length of the lens caused by variation in temperature. In addition, the embodiments are able to suppress the generation of cracks in the printed circuit board due to the concentration of stress, and are able to maintain the conductive connection between the printed circuit board and the terminal even if the terminal of the printed circuit board is breaks due to the concentration of stress.

The features, configurations, effects and the like described above in the embodiments are included in at least one embodiment, and but are not necessary to be limited to only one embodiment. In addition, the features, configuration, effects and the like exemplified in the respective embodiments may be combined with other embodiments or modified by those skilled in the art. Accordingly, content related to these combinations and modifications should be construed as falling within the scope of the embodiments.

The invention claimed is:

1. A lens moving apparatus comprising:
   a housing;
   a bobbin disposed in the housing;
   a first coil disposed on the bobbin;
   a magnet disposed on the housing;
   a base disposed below the bobbin; and
   a circuit board disposed on the base;
   wherein the circuit board comprises:
      a body disposed on an upper surface of the base;
      a bent portion bent from the body and disposed on an outer side surface of the base;
      a terminal disposed on the bent portion; and
      a coating layer disposed on an upper surface of the bent portion and an upper surface of the terminal;
   wherein a boundary line between the coating layer and the upper surface of the terminal comprises a first line, a second line, and an edge where the first line and the second line meet;
   wherein the edge is closer to a first end of the bent portion contacting the body than to the second end of the bent portion opposite to the first end of the bent portion.

2. The lens moving apparatus according to claim 1, wherein the boundary line has a shape of two equilateral sides of an isosceles triangle.

3. The lens moving apparatus according to claim 1, wherein the coating layer comprises a first region disposed on the upper surface of the terminal.

4. The lens moving apparatus according to claim 3, wherein the terminal comprises a plurality of terminals spaced apart from each other.

5. The lens moving apparatus according to claim 4, wherein the coating layer comprises a second region disposed between the plurality of terminals.

6. The lens moving apparatus according to claim 4, wherein the coating layer comprises first regions corresponding to the plurality of terminals,
   wherein the first regions are disposed on a portion of an upper surface of corresponding one of the plurality of terminals.

7. The lens moving apparatus according to claim 4, wherein the coating layer comprises a second region disposed between two terminals of the plurality of terminals, and
   wherein the coating layer exposes a first portion of the upper surface of the bent portion located between the second region and one of the two terminals and a second portion of the upper surface of the bent portion located between the second region and the other of the two terminals.

8. The lens moving apparatus according to claim 1, wherein a length of the boundary line is longer than a width of the terminal.

9. The lens moving apparatus according to claim 1, wherein the coating layer is made of photo solder resist ink or polyimide.

10. The lens moving apparatus according to claim 1, wherein the coating layer exposes a portion of the upper surface of the terminal.

11. The lens moving apparatus according to claim 3, wherein the boundary line has a shape of a round shape, an arcuate shape, or a semicircular shape between the first line and the second line.

12. The lens moving apparatus according to claim 1, wherein the upper surface of the terminal comprises a first side and a second side opposite to the first side, and
   wherein each of the first and second sides is parallel to a first direction from the first end of the bent portion toward the second end of the bent portion.

13. The lens moving apparatus according to claim 12, wherein a length between the edge and a line in the first direction is within a range of 0.03 mm to 0.07 mm, and
   wherein the line passes through a first point of the boundary line contacting the first side and a second point of the boundary line contacting the second side.

14. The lens moving apparatus according to claim 12, wherein the edge is closer to the first end of the bent portion than a first point of the boundary line contacting the first side and a second point of the boundary line contacting the second side.

15. The lens moving apparatus according to claim 14, wherein the edge is disposed between the first point of the boundary line and a second point of the boundary line.

16. The lens moving apparatus according to claim 1, comprising:
   an elastic member coupled to the bobbin and the housing;
   a second coil disposed on the circuit board so as to be opposite to the magnet;
   a support member electrically connecting the elastic member and the circuit board;
   a sensing magnet disposed on the housing and spaced apart from the magnet; and
   a first position sensor disposed on the bobbin,
   wherein the first position sensor is electrically connected to the elastic member.

17. The lens moving apparatus according to claim 16, comprising a second position sensor disposed under the circuit board and including a first sensor and a second sensor disposed on the base.

18. A lens moving apparatus comprising:
   a housing;
   a bobbin disposed in the housing;
   a first coil disposed on the bobbin;
   a magnet disposed on the housing;
   an upper elastic member coupled to an upper portion of the bobbin and an upper portion of the housing;
   a base disposed below the bobbin;
   a circuit board disposed on the base;
   a second coil disposed on the circuit board so as to be opposite to the magnet; and
   a support member electrically connecting the upper elastic member and the circuit board,
   wherein the circuit board comprises:
      a body disposed on an upper surface of the base;
      a bent portion bent from the body and disposed on an outer side surface of the base;
      terminals disposed on the bent portion and spaced apart from each other; and
      a coating layer disposed on an upper surface of the bent portion and an upper surface of the terminals;
   wherein the terminals comprise a first terminal,
   wherein a boundary line between the coating layer and the upper surface of the first terminal comprises a plurality of lines.

19. A camera module comprising:
   a lens barrel;
   the lens moving apparatus according to claim 1 for moving the lens barrel; and an image sensor for converting an image, introduced through the lens moving apparatus, into an electric signal.

\* \* \* \* \*